United States Patent
Park et al.

(10) Patent No.: US 12,475,624 B2
(45) Date of Patent: Nov. 18, 2025

(54) ELECTRONIC DEVICE FOR SYNTHESIZING TWO-DIMENSIONAL OBJECT WITH THREE-DIMENSIONAL OBJECT, OPERATION METHOD OF ELECTRONIC DEVICE, AND NON-TRANSITORY STORAGE MEDIUM

(71) Applicant: SAMSUNG ELECTRONICS CO., LTD., Suwon-si (KR)

(72) Inventors: Miji Park, Suwon-si (KR); Iseul Yu, Suwon-si (KR); Hyeonju Lee, Suwon-si (KR); Jinsoo Jang, Suwon-si (KR); Hoik Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 17/994,144

(22) Filed: Nov. 25, 2022

(65) Prior Publication Data

US 2023/0088965 A1  Mar. 23, 2023

Related U.S. Application Data

(63) Continuation of application No. PCT/KR2021/006598, filed on May 27, 2021.

(30) Foreign Application Priority Data

May 27, 2020 (KR) .......................... 10-2020-0063929

(51) Int. Cl.
 *G06T 13/20* (2011.01)
 *G06F 3/04845* (2022.01)
 *G06T 11/60* (2006.01)

(52) U.S. Cl.
 CPC .......... *G06T 13/20* (2013.01); *G06F 3/04845* (2013.01); *G06T 11/60* (2013.01)

(58) Field of Classification Search
 None
 See application file for complete search history.

(56) References Cited

U.S. PATENT DOCUMENTS 6,606,105 B1  8/2003  Quartetti
9,165,318 B1 * 10/2015  Pauley ............... G06Q 30/0643
(Continued)

FOREIGN PATENT DOCUMENTS

JP       6559871 B1    8/2019
KR  10-2015-0085869 A  7/2015
(Continued)

OTHER PUBLICATIONS

Communication dated Aug. 26, 2021, issued by the International Searching Authority in counterpart International Application No. PCT/KR2021/006598 (PCT/ISA/210).
(Continued)

*Primary Examiner* — Kyle Zhai
(74) *Attorney, Agent, or Firm* — Sughrue Mion, PLLC

(57) ABSTRACT

An embodiment relates to an electronic device for synthesizing a two-dimensional object with a three-dimensional object. The electronic device may comprise a display, a memory, and at least one processor electrically connected to the display and the memory, wherein the processor may be configured to: control the display to display a three-dimensional object, at least one two-dimensional object, and at least one first button corresponding to the at least one two-dimensional object; in response to an input for selection of the at least one first button, associate the at least one two-dimensional object with a part of the three-dimensional object so that the at least one two-dimensional object moves in response to movement of the part of the three-dimensional object; and generate a first synthetic image including the three-dimensional object and the at least one two-dimen-
(Continued)

sional object associated with the part of the three-dimensional object.

13 Claims, 26 Drawing Sheets

(56) References Cited

U.S. PATENT DOCUMENTS

| | | | |
|---|---|---|---|
| 10,325,416 B1 | 6/2019 | Scapel et al. | |
| 2013/0097552 A1 | 4/2013 | Villaron et al. | |
| 2015/0121251 A1 | 4/2015 | Kadirvel et al. | |
| 2017/0309051 A1* | 10/2017 | Yamasaki | G06T 19/00 |
| 2018/0108183 A1 | 4/2018 | Schuneman et al. | |
| 2018/0268609 A1 | 9/2018 | Schneider et al. | |
| 2019/0058836 A1 | 2/2019 | Lee et al. | |
| 2019/0114038 A1 | 4/2019 | Geiger et al. | |
| 2019/0182563 A1 | 6/2019 | Jung et al. | |
| 2019/0354279 A1 | 11/2019 | Feinberg | |
| 2020/0045245 A1* | 2/2020 | Van Os | H04N 23/611 |
| 2020/0066022 A1* | 2/2020 | Leong | G06F 3/0482 |
| 2020/0353354 A1* | 11/2020 | Yonezu | A63F 13/358 |
| 2020/0402304 A1 | 12/2020 | Hwang et al. | |
| 2021/0233325 A1 | 7/2021 | Kawakami et al. | |

FOREIGN PATENT DOCUMENTS

| | | |
|---|---|---|
| KR | 10-2017-0093451 A | 8/2017 |
| KR | 10-2018-0080783 A | 7/2018 |
| KR | 10-2019-0019606 A | 2/2019 |
| KR | 10-2019-0101832 A | 9/2019 |

OTHER PUBLICATIONS

Communication dated Aug. 26, 2021, issued by the International Searching Authority in counterpart International Application No. PCT/KR2021/006598 (PCT/ISA/237).

Communication issued Jan. 14, 2025 by the Korean Intellectual Property Office in counterpart Korean Patent Application No. 10-2020-0063929.

Communication issued Sep. 25, 2025 by the Korean Intellectual Property Office in Korean Patent Application No. 10-2020-0063929.

* cited by examiner

ELECTRONIC DEVICE FOR SYNTHESIZING TWO-DIMENSIONAL OBJECT WITH THREE-DIMENSIONAL OBJECT, OPERATION METHOD OF ELECTRONIC DEVICE, AND NON-TRANSITORY STORAGE MEDIUM

CROSS-REFERENCE TO RELATED APPLICATION

This application is a Continuation application of International Application PCT/KR2021/006598 filed on May 27, 2021, which claims benefit of Korean Patent Application No. 10-2020-0063929, filed on May 27, 2020, at the Korean Intellectual Property Office, the disclosures of which are incorporated herein in their entireties by reference.

BACKGROUND

Field

Various embodiments of this disclosure relate to an electronic device for synthesizing a two-dimensional object with a dynamically moving three-dimensional object, an operation method of the electronic device, and a non-transitory storage medium.

Description of Related Art

Recently, electronic devices have been developed in various forms for the convenience of users, and various services are provided.

Electronic devices generate a three-dimensional object (e.g., a three-dimensional avatar or a three-dimensional image) by characterizing the user and combine the generated three-dimensional object with various services (e.g., transmission and reception of messages, Internet shopping, health, and augmented reality, etc.), thereby providing the same.

SUMMARY

In conventional electronic devices, a three-dimensional object (e.g., a three-dimensional avatar or a three-dimensional image) is modified to conform to the user's features, and a two-dimensional object such as text, an image, an emoticon, or a sticker is added thereto by an editing function such as drawing or like, thereby providing the same to various services, or an object such as a sticker is added thereto.

However, according to the conventional electronic devices, the three-dimensional object is not associated with the two-dimensional object such as text, an image, an emoticon, or a sticker added thereto, and if the three-dimensional object moves according to provision of a dynamic three-dimensional object, the three-dimensional object moves separately from the two-dimensional object, so that the added two-dimensional object is unable to move together.

In addition, in the conventional electronic devices, when synthesizing a two-dimensional object with a three-dimensional object, it is difficult for the user to manipulate a plurality of objects, and the user fails to intuitively recognize manipulation of the plurality of objects.

Various embodiments of the present disclosure may provide an electronic device for synthesizing a two-dimensional object with at least a part of a three-dimensional object such that the two-dimensional object moves in response to movement of the three-dimensional object, an operation method of the electronic device, and a non-transitory storage medium.

According to an embodiment of the present disclosure, an electronic device for synthesizing a two-dimensional object with a three-dimensional object may be provided. The electronic device may include a display, a memory, and at least one processor electrically connected to the display and the memory. The processor may be configured to control the display to display a three-dimensional object, a first two-dimensional object, and a first button corresponding to the first two-dimensional object; associate, in response to an input for selecting the first button, the first one two-dimensional object with a part of the three-dimensional object, wherein the first two-dimensional object moves in response to movement of the part of the three-dimensional object; and generate a first synthetic image comprising the three-dimensional object and the first two-dimensional object associated with the part of the three-dimensional object.

In some embodiments, a method for synthesizing a two-dimensional object with a three-dimensional object may be provided. The method may be executed by a processor, and may include controlling a display of an electronic device to display a three-dimensional object, a first two-dimensional object, and a first button corresponding to the first two-dimensional object; in response to an input for selecting the first button, configuring the first two-dimensional object to be associated with a part of the three-dimensional object, wherein the first two-dimensional object moves in response to movement of the part of the three-dimensional object; producing a first synthetic image comprising the three-dimensional object and the first two-dimensional object associated with the part of the three-dimensional object.

In some embodiments, a non-transitory computer-readable storage medium for storing a program including executable instructions may be provided. The instructions, when executed by a processor, the processor to control a display of an electronic device to display a three-dimensional object, a first two-dimensional object, and a first button corresponding to the first two-dimensional object; in response to an input for selecting the first button, configure the first two-dimensional object to be associated with a part of the three-dimensional object wherein the first two-dimensional object moves in response to movement of the part of the three-dimensional object; and generate a first synthetic image including the three-dimensional object and the first two-dimensional object associated with the part of the three-dimensional object.

An electronic device according to various embodiments may display, on the execution screen, a button to configure the first two-dimensional object to be associated with a part of the three-dimensional object, and if the displayed button is selected, associate the first two-dimensional object with the part of the three-dimensional object to generate a synthetic image, thereby enabling at least one two-dimensional object to move in response to movement of at least a part of the three-dimensional object displayed on the execution screen, enabling intuitive identification of the manipulation of at least one two-dimensional object and related positions thereof, and enabling tracking of the movement.

BRIEF DESCRIPTION OF DRAWINGS

In connection with the description of the drawings, the same or similar reference numerals may be used for the same or similar elements.

DETAILED DESCRIPTION

Hereinafter, an electronic device according to various embodiments will be described with reference to the accompanying drawings. The term "user" used in various embodiments may refer to a person who uses an electronic device or a device (e.g., an artificial intelligence electronic device) using the electronic device.

Figure 1:
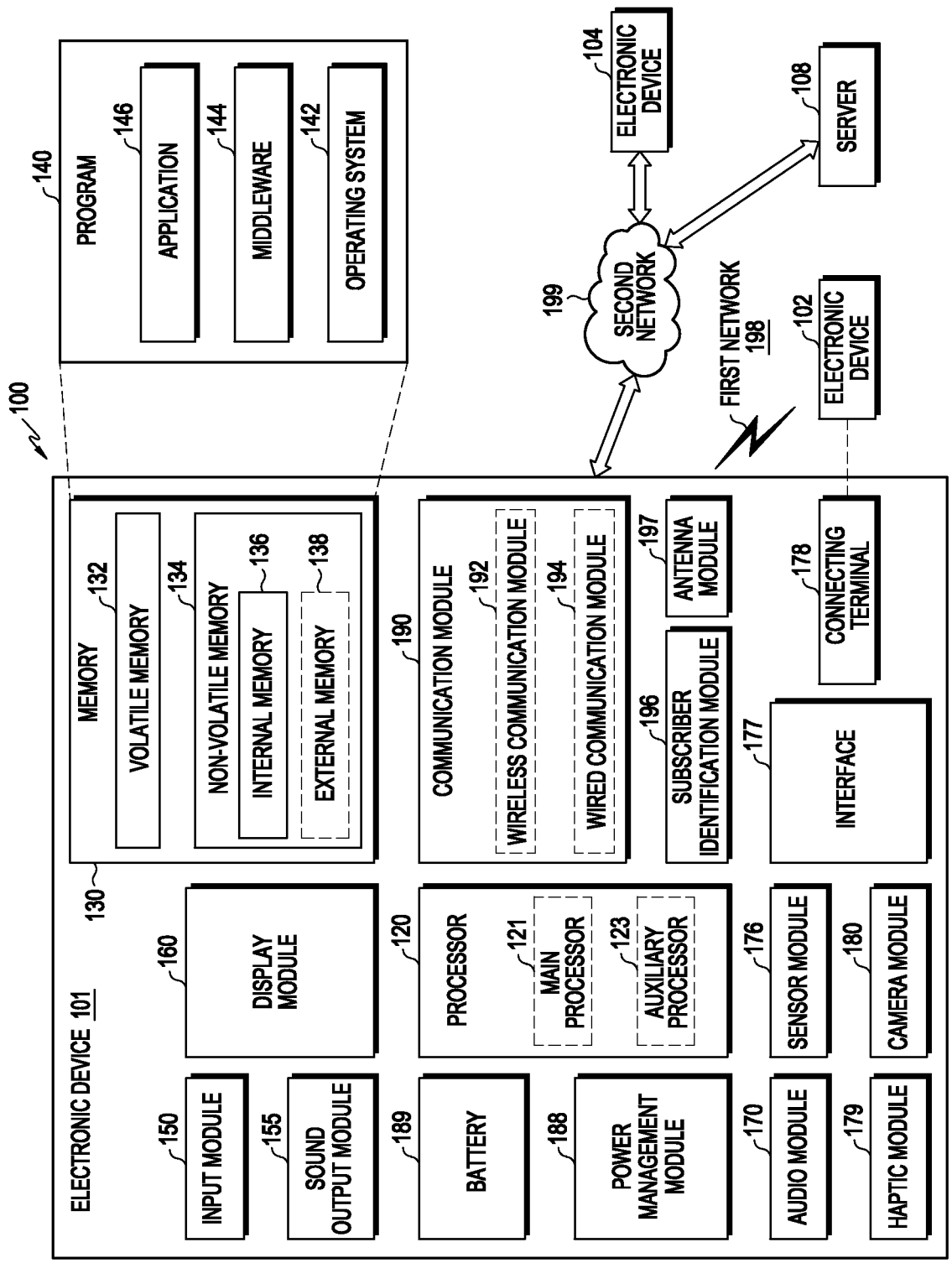
FIG. 1 is a diagram illustrating a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. As an example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. As an example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
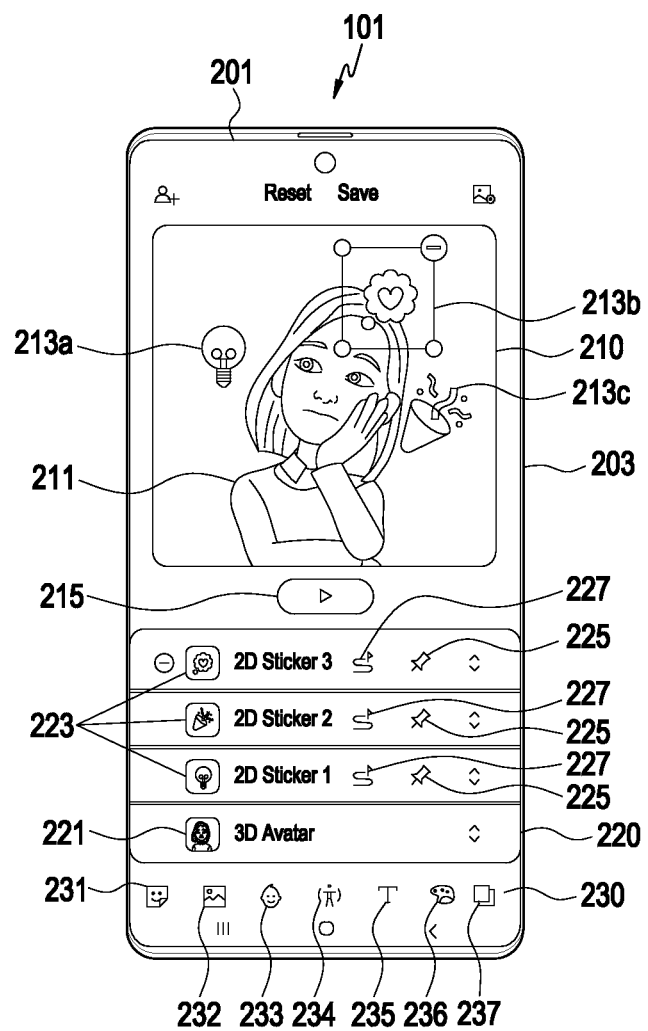
FIG. 2 is a diagram illustrating an example of a screen of an electronic device according to an embodiment.

FIG. 2 is a diagram illustrating an example of a screen of an electronic device according to an embodiment.

Referring to FIGS. 1 and 2, an electronic device 101 (e.g., the electronic device 101 in FIG. 1) according to an embodiment may include at least one processor 120, a display 201, and a memory 130. The electronic device 101 may be configured to include a communication module 190 for communicating with an external electronic device (e.g., the electronic device 102 or 104 or the server 108 in FIG. 1). The electronic device 101 may be configured to include a sensor module 176 including at least one sensor (e.g., at least one of a touch sensor, a motion sensor, a pressure sensor, a gyro sensor, and a camera sensor) for detecting a user gesture input. In addition, the electronic device 101 may be configured to further include other elements (e.g., other elements shown in FIG. 1 or elements other than that) necessary for synthesizing at least one two-dimensional object with a three-dimensional object described below.

Referring to FIGS. 1 and 2, a processor 120 of the electronic device 101 according to an embodiment may control a display 201 (e.g., the display module 160 in FIG. 1) to display an execution screen 201 for image synthesis according to execution of an application (e.g., a function or a program) for image synthesis. The processor 120 may control the display 201 to display the execution screen 203 configured as a first area 210, a second area 220, and a third area 230. The execution screen 203 is not limited thereto and may be configured in various ways.

The processor 120 according to an embodiment may control the display 201 to display a three-dimensional object (e.g., a three-dimensional avatar, an augmented reality (AR) emoji, or a three-dimensional image) 211 and at least one two-dimensional object (e.g., a two-dimensional sticker or a two-dimensional image) 213a, 213b, or 213c on the first area 210. The processor 120 may control the display 201 to display an object (e.g., a button, a menu, an image, an icon, or text) (hereinafter, referred to as a play button) 215 for reproducing at least one two-dimensional object 213a, 213b, or 213c synthesized with the three-dimensional object 211 on the first area 210. As an example, the play button 215 may be configured to pre-reproduce the movement of the three-dimensional object 211 before producing a final synthetic image using at least one two-dimensional object 213a, 213b, or 213c synthesized with the three-dimensional object 211 in the first area 210. Although the play button 215 has been described as being displayed on the first area 210, it may be displayed on another area (e.g., the second area 220 or the third area 230) or may not be displayed on the execution screen 203 for convenience. As an example, the electronic device 101 may not display the play button 215 when the synthetic image is reproduced by an input through a specific physical button or a specified gesture input for reproduction of the synthetic image.

The processor 120 according to an embodiment may control the display 201 to display objects related to the three-dimensional object 211 and at least one two-dimensional object 213a, 213b, or 213c on the second area 220. As an example, the processor 120 may control the display 201 to display an object (e.g., a button, a menu, an image, an icon, or text) 221 for selecting the three-dimensional object 211 and an object (e.g., a button, a menu, an image, an icon, or text) 223 for selecting at least one two-dimensional object 213a, 213b or 213c. The processor 120 may control the display 201 to display an object (e.g., a button, a menu, an image, an icon, or text) (hereinafter, referred to as a first button 225) for configuring at least one two-dimensional object 213a, 213b, or 213c synthesized with the three-dimensional object 211 to be associated with at least a part of the three-dimensional object 211 so as to correspond to the at least one two-dimensional object 213a, 213b or 213c. The processor 120 may control the display 201 to display an object (e.g., a button, a menu, an image, an icon, or text) (hereinafter, referred to as a second button 227) for configuring at least one two-dimensional object 213a, 213b, or 213c synthesized with the three-dimensional object 211 to move on the execution screen 201 according to movement of a specified user gesture (e.g., drag and drop) so as to correspond to the at least one two-dimensional object 213a, 213b or 213c. As an example, in response to an input for selection of at least one second button 227, the processor 120 may detect an input of a specified gesture (e.g., drag and drop) for moving another two-dimensional object that is not associated with the three-dimensional object 211 and identify a movement path of the other two-dimensional object according to the input of a specified gesture. The processor 120 may further specify the movement of the other two-dimensional object, based on the identified movement path, to the generated first synthetic image, modifying the first synthetic image. In response to a reproduction request, the processor 120 may reproduce the first synthetic image modified such that at least one two-dimensional object 213a, 213b, or 213c moves in response to the movement of at least a part of the three-dimensional object and such that the other two-dimensional object moves based on the identified movement path. As another example, the processor 120 may detect a change in the position for associating at least one two-dimensional object 213a, 213b, or 213c with the three-dimensional object 211 due to movement of at least one two-dimensional object 213a, 213b, or 213c using at least one sensor. When the position of at least one two-dimensional object 213a, 213b or 213c changes, the processor 120 may control the display 201 to display a visual effect at the changed position in order for the user to intuitively identify that at least one two-dimensional object 213a, 213b or 213c is associated with the three-dimensional object 211. As an example, the processor 120 may control the display 201 to display text or an image indicating the changed position on at least one first button 225 so that the user may intuitively identify the position associated with the three-dimensional object 211.

The processor 120 according to an embodiment may control the display 201 to display objects (at least one of 231, 232, 233, 234, 235, 236 or 237) for editing an image on the third area 230. Among the objects for editing an image, an object 231 may be a menu to configure a two-dimensional object (e.g., a two-dimensional sticker or a two-dimensional image). Among the objects for editing an image, an object 232 may be a menu to configure a background image of the three-dimensional object 211 in the first area 210. Among the objects for editing an image, an object 233 may be a menu to configure emotions (e.g., facial expressions) of the three-dimensional object 211. Among the objects for editing an image, an object 234 may be a menu to configure movement of the three-dimensional object 211. Among the objects for editing an image, an object 235 may be a menu to add text to the first area 210. Among the objects for editing an image, an object 237 may be a menu to provide a free drawing function (e.g., drawing, color (coloring), cut, rotate, eraser, and zoom-in/out functions). Among the objects for editing an image, an object 237 may be a menu to provide a function related to layers of the objects displayed on the first area 210 (at least one of the three-dimensional image 211, at least one two-dimensional object 213a, 213b, or 213c, a background image, text, or an additional image).

FIGS. 3A, 3B, 3C, 3D, 3E, 3F and 3G are diagrams illustrating an example of synthesizing a two-dimensional object with a three-dimensional object according to an embodiment.

Figure 3A:
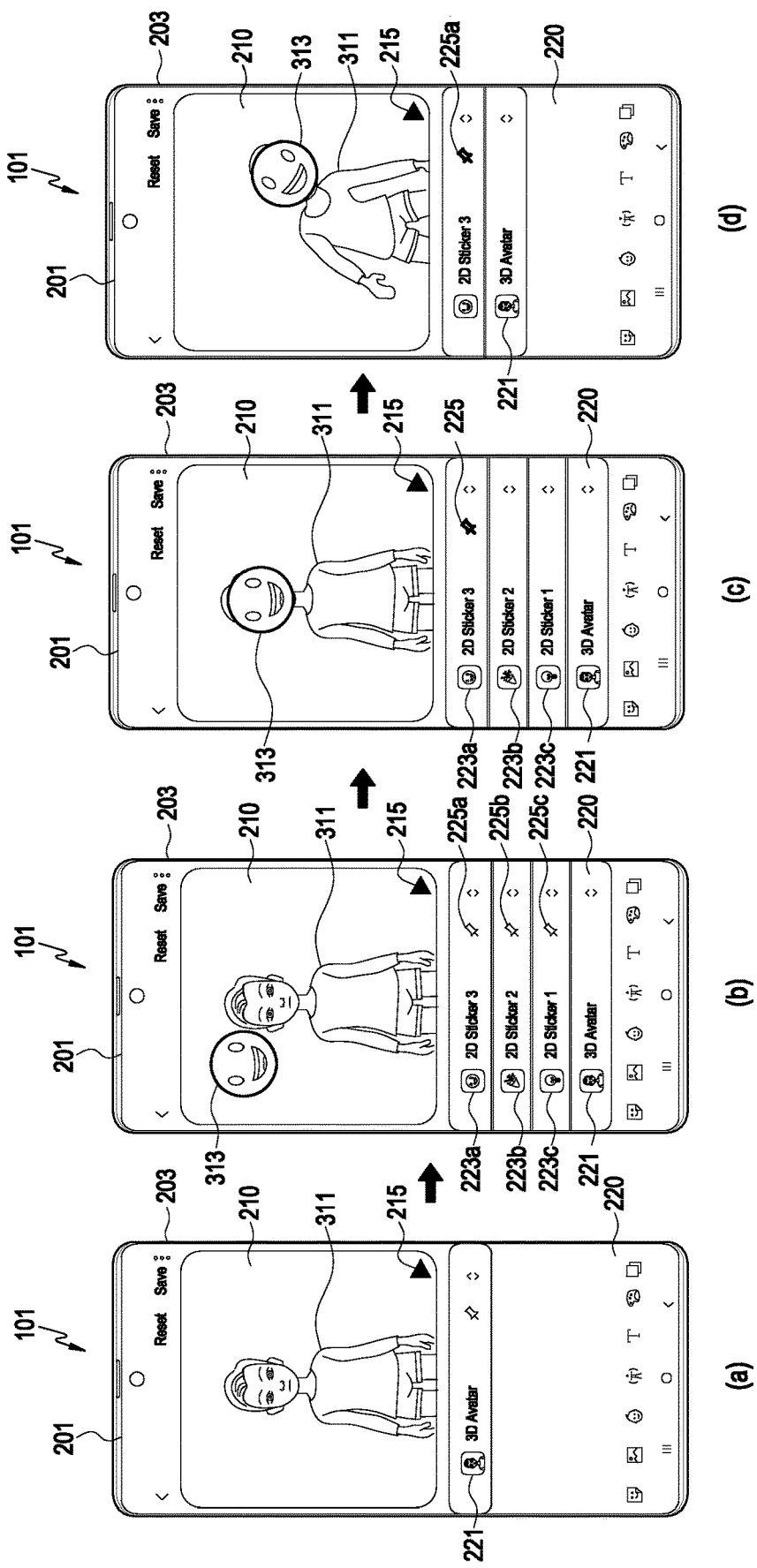
FIGS. 3A-3G are diagrams illustrating an example of synthesizing a two-dimensional object with a three-dimensional object according to an embodiment.

Referring to FIG. 3A, if an object 221 for selecting a three-dimensional object is selected, the processor 120 according to an embodiment may control the display 201 to display a three-dimensional object 311 corresponding to the selected object 221 on the first area 210 of the execution screen 203. As an example, the processor 120 may further display objects representing a plurality of three-dimensional objects 311 by expanding the object 221 for selecting the three-dimensional object. As an example, the processor 120 may display three-dimensional objects in the form of a list on the second area 220 when the execution screen 203 is activated. As another example, the processor 120 may control the display 120 to display a screen (not shown) for selecting types of three-dimensional objects before displaying the execution screen 203 and, upon selection of a type of at least one three-dimensional object on the displayed screen, display a three-dimensional object corresponding to the selected type of three-dimensional object on the execution screen 203.

If one object 223a is selected from the objects 223a, 223b, and 223c for selecting the two-dimensional objects displayed on the second area 220 of the execution screen 203, the processor 120 according to an embodiment may control the display 201 to display a two-dimensional object 313 corresponding to the selected object 223a at a position overlapping or adjacent to at least a part of the three-dimensional object 311. If the first button 225a corresponding to the selected object 223a is selected, the processor 120 may configure the two-dimensional object 313 to be associated with at least a part of the three-dimensional object 311. As an example, the processor 120 may associate position information (e.g., coordinates (x, y)) of the two-dimensional object 313 therewith, based on position information (e.g., coordinates (x, y)) of a face area of the three-dimensional object 313.

Figure 3B:
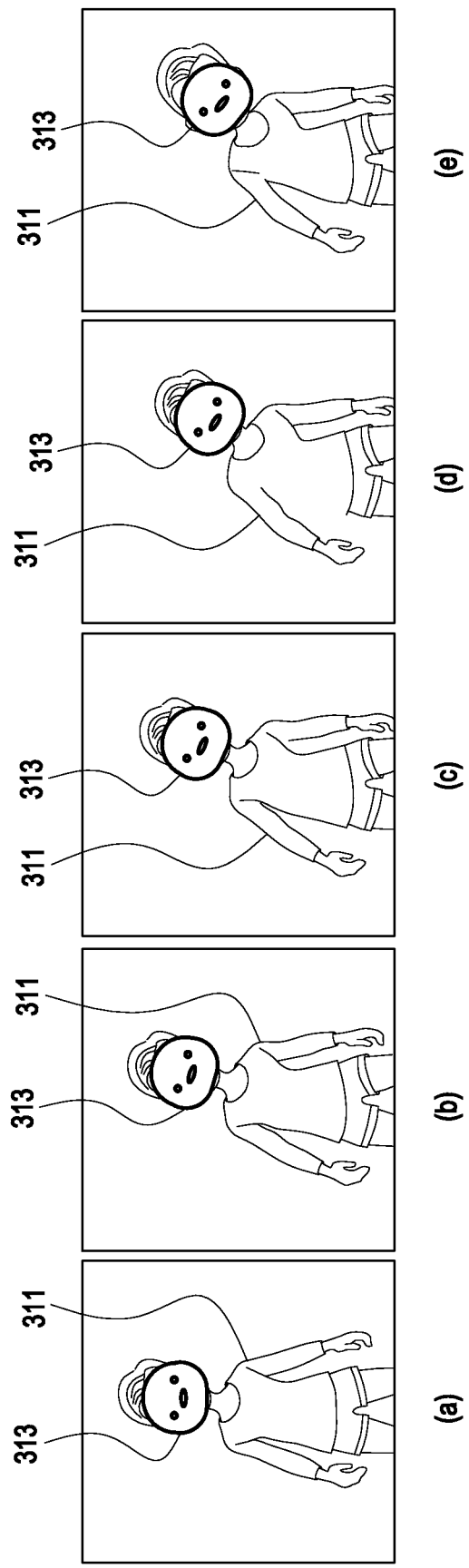

Referring to FIGS. 3A and 3B, if a play button 215 is selected, the processor 120 according to an embodiment may assign a configured movement to the three-dimensional object 311 and reproduce the movement of the three-dimensional object 311. The processor 120 may reproduce movement such that the two-dimensional object 313 associated with at least a part of the three-dimensional object 313 moves in response to the movement of the three-dimensional object 311. As an example, as the position information (e.g., coordinates (x, y)) of the face area of the three-dimensional object 313 is changed, the processor 120 may change the position information (e.g., the coordinates (x, y)) of the associated two-dimensional object 313 in response thereto. In some embodiments, the two-dimensional object 313, which is associated with the position information of the face area of the three-dimensional object 311, may move according to the movement of the face area of the three-dimensional object 311 as shown in (a) to (e) in FIG. 3B. Here, the two-dimensional object 313 may be a static two-dimensional image.

Figure 3C:
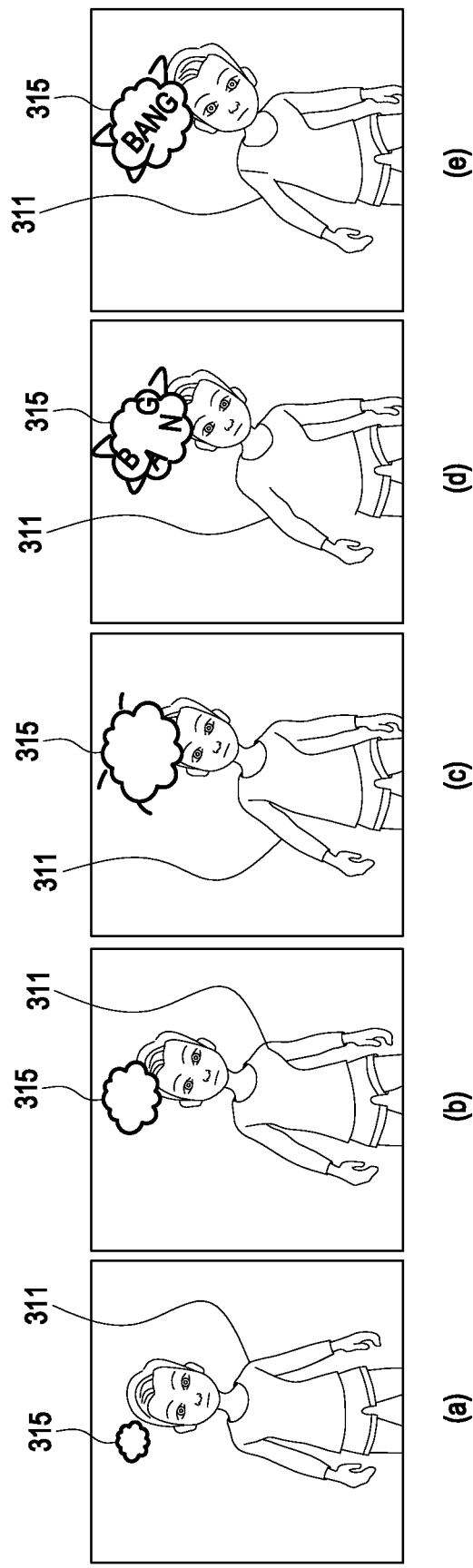

Referring to FIGS. 3A and 3C, the processor 120 according to an embodiment may control the display 201 to display a dynamic two-dimensional object 315 at a position overlapping or adjacent to at least a part of the three-dimensional object 311. If a play button 215 is selected, the processor 120 may reproduce the movement of the three-dimensional object 311 to which a configured movement is assigned and reproduce the dynamic two-dimensional object 315 to change dynamically in response to the movement of the three-dimensional object 311. As an example, the processor 120 may associate the dynamic two-dimensional object 315 with position information (e.g., coordinates (x, y)) of the face area of the three-dimensional object 313. As the position information (e.g., coordinates (x, y)) of the face area of the three-dimensional object 313 changes, the processor 120 may change the shape (form or visual expression) of the dynamic two-dimensional object 315 associated therewith. In some embodiments, the two-dimensional object 315 associated with the position information of the face area of the three-dimensional object 311 may change in the shape (form or visual expression) thereof as shown in (a) to (e) in FIG. 3C whenever the position information of the face area of the three-dimensional object 311 changes.

Figure 3D:
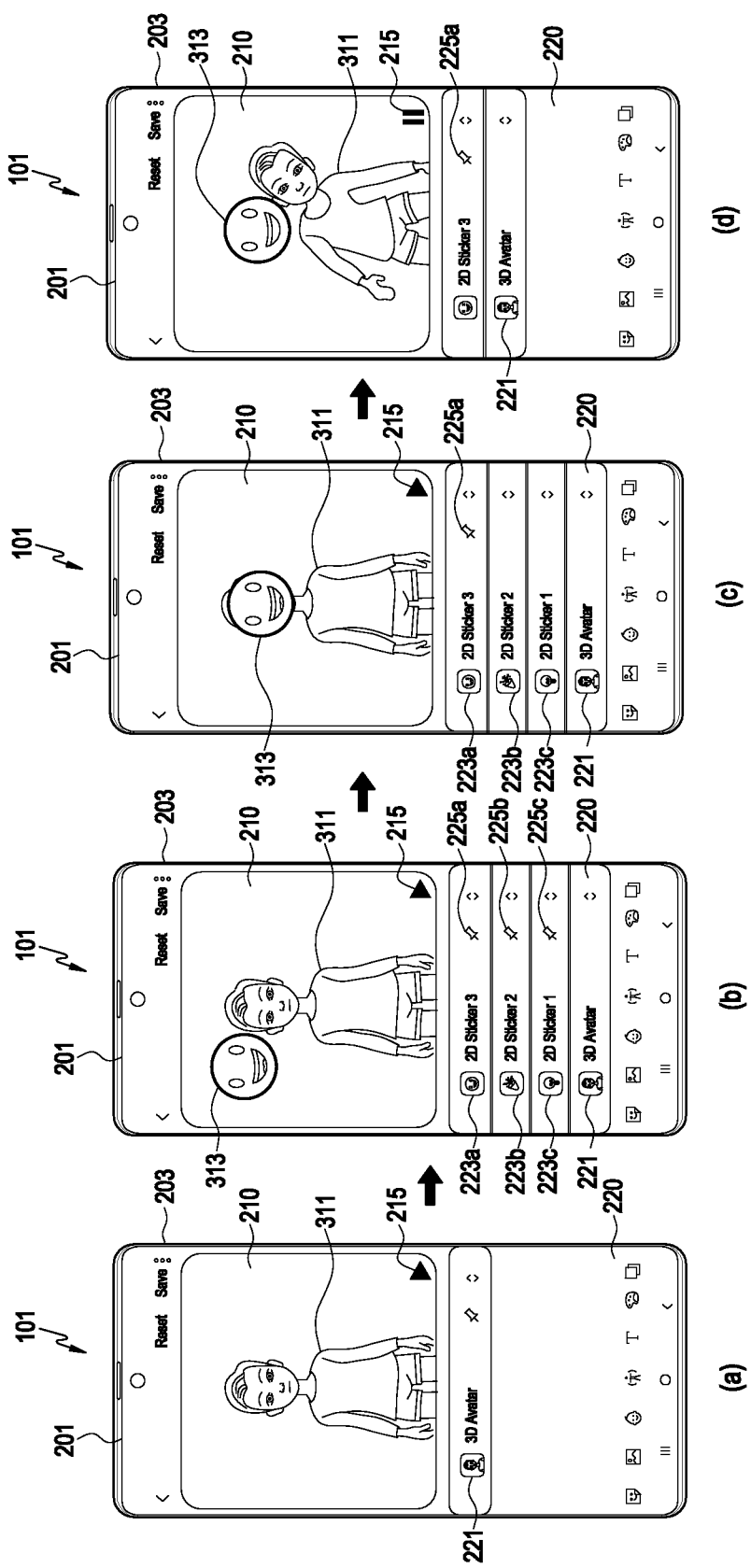
Figure 3E:
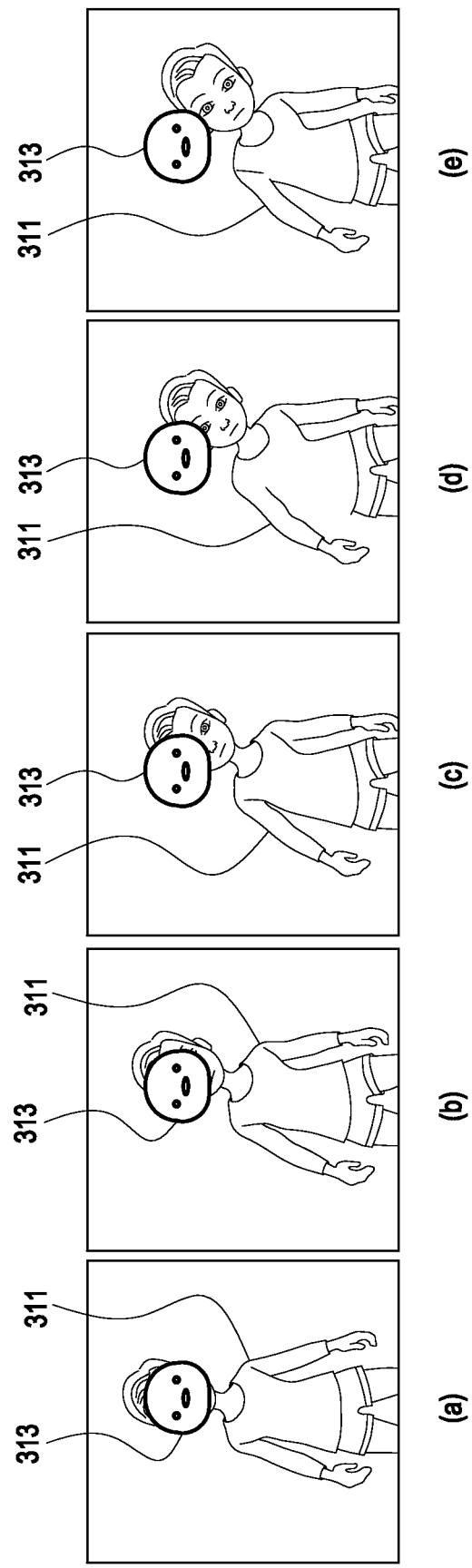

Referring to FIGS. 3D and 3E, if one object 223a is selected from the objects 223a, 223b and 223c for selecting the two-dimensional object displayed on the second area 220 of the execution screen 203, the processor 120 according to an embodiment may control the display 201 to display a two-dimensional object 313 corresponding to the selected object 223a at a position overlapping or adjacent to at least a part of the three-dimensional object 311. If a play button 215 is selected, instead of selecting the first button 225a corresponding to the selected object 223a, the processor 120 may reproduce the movement of the three-dimensional object 311 to which a configured movement is assigned and reproduce the two-dimensional object 313 so as not to move in response to the movement of the three-dimensional object 311. As an example, as shown in (a) to (e) in FIG. 3E, the processor 120 may reproduce the movement such that the face area of the three-dimensional object 311 to which a movement is assigned moves and such that the two-dimensional object 313 remains at a display position (coordinates (x, y)) thereof without moving.

Figure 3F:
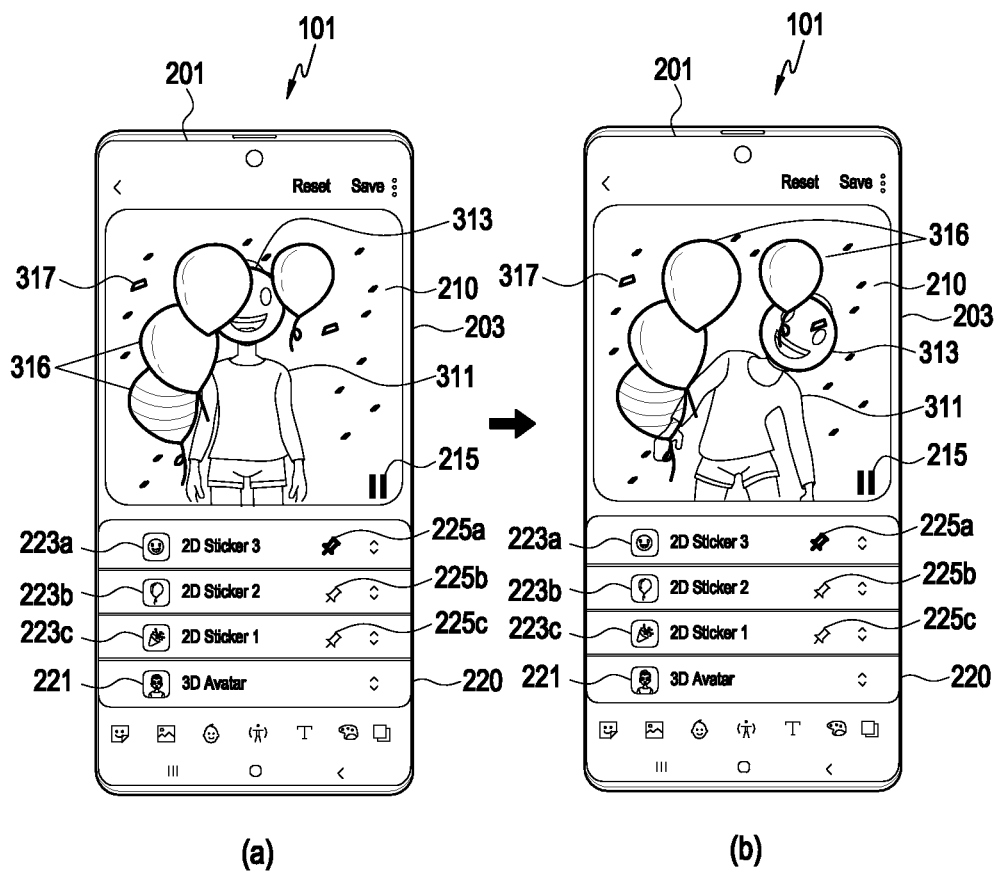

Referring to FIG. 3F, if an object 221 for selecting a three-dimensional object is selected, the processor 120 according to an embodiment may control the display 201 to display a three-dimensional object 311 corresponding to the selected object 221 on the first area 210 of the execution screen 203. If a plurality of objects 223a, 223b, and 223c is selected from among the objects 223a, 223b, and 223c for selecting the two-dimensional object, the processor 120 may control the display 201 to display a plurality of two-dimensional objects 313, 316, and 317 corresponding to the plurality of selected objects 223a, 223b, and 223c at respective positions overlapping or adjacent to at least a part of the three-dimensional object 311. If a first button 225a is selected from first buttons 225a, 225b, and 225c respectively corresponding to the plurality of objects 223a, 223b, and 223c, the processor 120 may configure the two-dimensional object 313 so as to be associated with at least a part of the three-dimensional object 311. If a play button 215 is selected, the processor 120 may reproduce the movement of the three-dimensional object 311 to which a configured movement is assigned and perform reproduction such that the associated two-dimensional object 313 moves in response to the movement of the three-dimensional object 311 and such that other two-dimensional objects 316 and 317 do not move. As an example, the processor 120 may reproduce movement to change the position information (e.g., coordinates (x, y)) of the two-dimensional object 313 associated with the position information (e.g., coordinates (x, y)) of the face area of the three-dimensional object 311 and maintain other two-dimensional objects 316 and 317 at display positions (coordinates (x, y)) thereof.

Figure 3G:
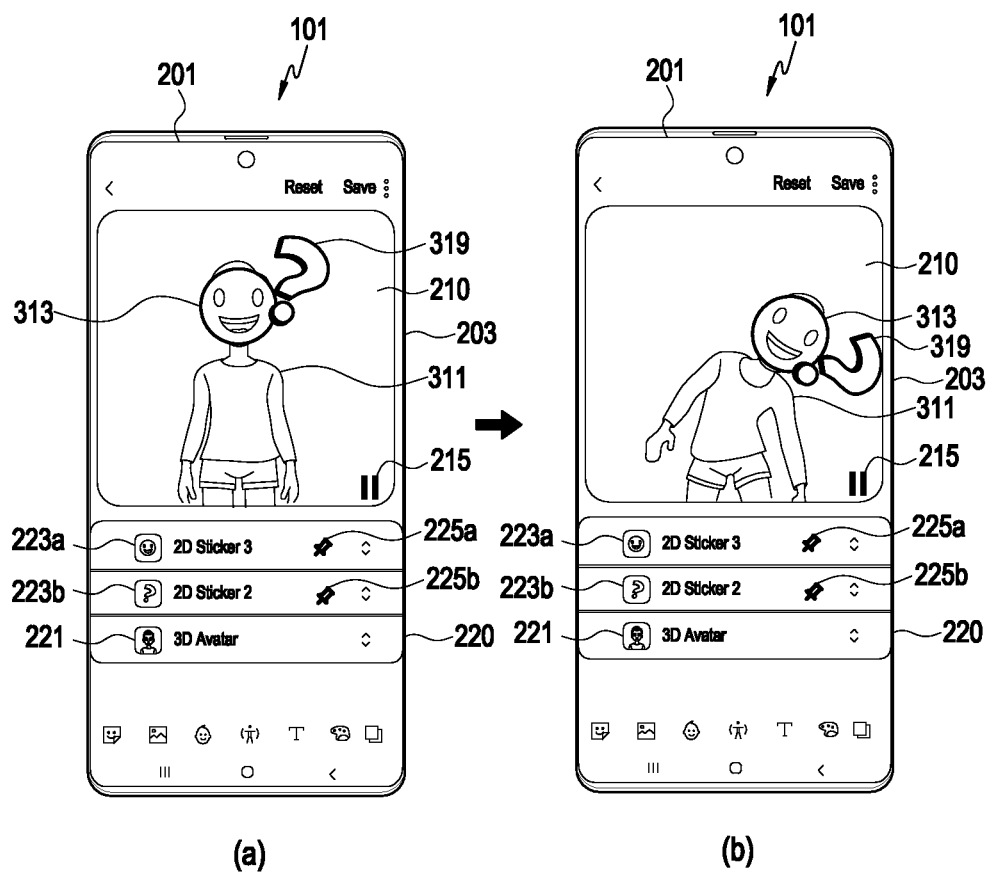

Referring to FIG. 3G, if a plurality of objects 223a and 223b is selected from among the objects 223a, 223b, and 223c for selecting the two-dimensional object, the processor 120 according to an embodiment may control the display 201 to display a plurality of two-dimensional objects 313 and 319 corresponding to the plurality of selected objects 223a and 223b at respective positions overlapping or adjacent to at least a part of the three-dimensional object 311. If first buttons 225a and 225b respectively corresponding to the plurality of objects 223a and 223b are selected, the processor 120 may configure the plurality of two-dimensional objects 313 and 319 so as to be associated with at least a part of the three-dimensional object 311. If a play button 215 is selected, the processor 120 may reproduce the movement of the three-dimensional object 311 to which a configured movement is assigned and reproduce the plurality of associated two-dimensional objects 313 and 319 so as to move in response to the movement of the three-dimensional object 311. As an example, the processor 120 may respectively change the position information (e.g., coordinates (x, y)) of the plurality of two-dimensional objects 313 and 319 associated with the position information (e.g., coordinates (x, y)) of the face area of the three-dimensional object 311.

Referring to FIGS. 1 and 2, the processor 120 of the electronic device 101 according to an embodiment may control the display 201 to display the synthetic image generated by synthesizing the two-dimensional object with the three-dimensional object, as shown in FIGS. 2 and 3A to 3G, in another application (e.g., AR camera or Bixby vision). The processor 120 may control the display 201 to display, when the generated synthetic image is displayed on a screen of another application, an edit screen for editing the synthetic image on the screen of the other application, to overlap the same. As an example, the edit screen may include at least one object for selecting the three-dimensional object, at least one object for selecting the two-dimensional object, a first button (e.g., the first button 225 in FIG. 2) and a second button (e.g., the second button 227 in FIG. 2) corresponding to the respective objects, and/or a third button (an object, a menu, an image, or text) for expanding each object. If the first button included in the edit screen displayed on the screen of another application is in an on state, the processor 120 according to an embodiment may identify that at least one two-dimensional object is associated with at least a part of the three-dimensional object included in the first synthetic image. In response to a request for reproduction, the processor 120 may reproduce the synthetic image (e.g., the first synthetic image) such that the associated two-dimensional object moves in response to the movement of the three-dimensional object on the screen of another application. If the first button included in the edit screen displayed on the screen of another application switches to an off state by a specified gesture, the processor 120 according to an embodiment may configure the two-dimensional object associated with at least a part of the three-dimensional object such that it is not associated with at least a part of the three-dimensional object. In response to a request for reproduction, the processor 120 may reproduce the synthetic image (e.g., the second synthetic image) such that the three-dimensional object moves according to a specified movement on the screen of another application and such that at least one two-dimensional object remains at a display position thereof without moving when the three-dimensional object moves.

Figure 4:
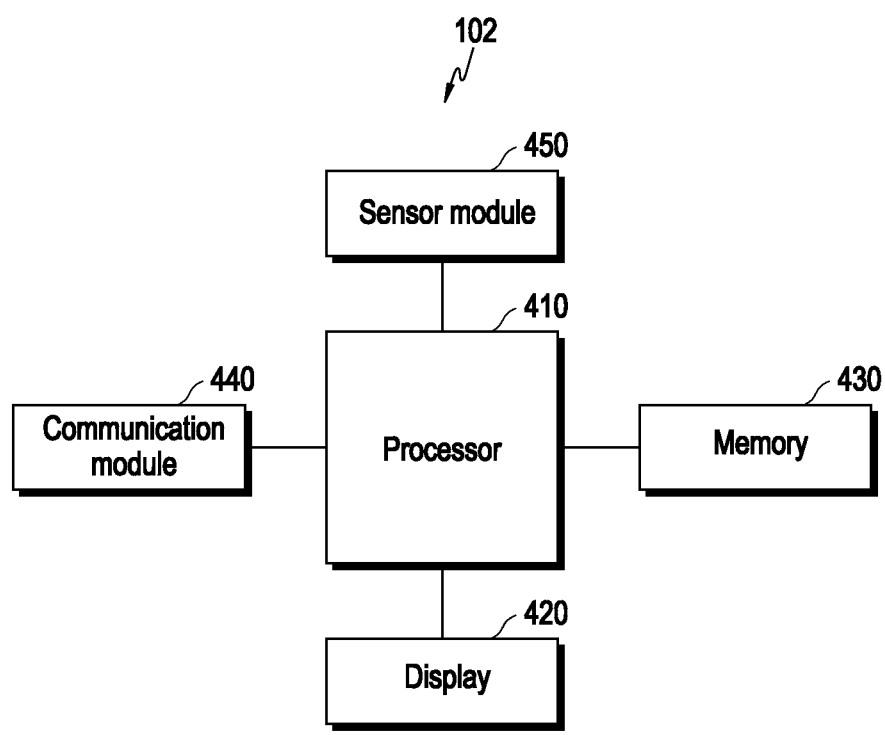
FIG. 4 is a diagram illustrating an example of the configuration of an electronic device according to another embodiment.

FIG. 4 is a diagram illustrating an example of the configuration of an electronic device according to another embodiment.

Referring to FIG. 4, an electronic device 102 (e.g., the electronic device 102 or 104 in FIG. 1) according to another embodiment may be, for example, smart glasses (e.g., AR glasses (HMD)) capable of being worn in the user and may be configured to implement augmented reality (AR). The electronic device 102 may be configured to include at least one processor 410, a display 420, a memory 430, a communication module 440, and a sensor module 450.

The processor 410 of the electronic device 102 according to another embodiment may receive a synthetic image (e.g., a first synthetic image, a second synthetic image, or a third synthetic image) generated by the electronic device 101 through the communication module 440, store the received synthetic image in the memory 430, and control the display 420 to display the received synthetic image. As an example, the processor 410 may transparently show the position viewed by the user and display a synthetic image (e.g., a first synthetic image, a second synthetic image, or a third synthetic image) through augmented reality (AR).

If a specified user gesture is detected through at least one sensor (e.g., at least one of a touch sensor, a motion sensor, a pressure sensor, a gyro sensor, or a camera sensor) included in the sensor module 440, the processor 410 may identify that the synthetic image received from the electronic device 101 has been selected, and control the display 420 to display an edit screen for editing the synthetic image. Here, the edit screen may be a screen in which the execution screen 203 shown in FIG. 2 is briefly displayed. The processor 410 may receive information related to an edit screen from the electronic device 101 or a server (not shown), configure an edit screen, and control the display 420 to display the same.

If a first button included in the displayed edit screen is in the off state, the processor 410 according to another embodiment may identify the received synthetic image as a second synthetic image in which at least one two-dimensional object is not associated with at least a part of the three-dimensional object. If the first button in the off state is selected by a specified user gesture, the processor 410 may switch the first button to the on state and display the same, may associate at least one two-dimensional object with at least a part of the three-dimensional object included in the synthetic image, and may reproduce the second synthetic image, in response to a request for reproduction, such that the associated two-dimensional object moves in response to the movement of the three-dimensional object.

If the first button included in the displayed edit screen is in the on state, the processor 410 according to another embodiment may identify the received synthetic image as a first synthetic image in which at least one two-dimensional object is associated with at least a part of the three-dimensional object. If the first button in the on state is selected by the specified user gesture, the processor 410 may switch the first button to the off state and display the same, may configure at least one two-dimensional object so as not to be associated with at least a part of the three-dimensional object included in the synthetic image, and may reproduce the first synthetic image, in response to a request for reproduction, such that the three-dimensional object moves according to a specified movement and such that at least one two-dimensional object remains at a display position thereof.

The processor 120 according to another embodiment may control the communication module 440 to communicate with the electronic device 101 (e.g., the electronic device 101 in FIG. 1) and/or an external electronic device (e.g., a wearable device or an accessory device) (not shown). As an example, the processor 120 may display the synthetic image and/or the edit screen in the same way by interworking with the electronic device 101 or an external electronic device.

As described above, the primary elements of the electronic device 102 according to another embodiment of the present disclosure have been described as shown in FIG. 4. However, in another embodiment of the present disclosure, not all of the elements illustrated in FIG. 4 are essential elements, and the electronic device 102 may be implemented by more or fewer elements than the illustrated elements. In addition, the positions of the primary elements of the electronic device 102 described above with reference to FIG. 4 may vary according to various embodiments.

An electronic device (e.g., the electronic device 101 in FIG. 1) according to an embodiment of the present disclosure may include a display (e.g., the display module 160 in FIG. 1 or the display 201 in FIG. 2), a memory (e.g., the memory 130 in FIG. 1), and at least one processor (e.g., the processor 120 in FIG. 1) electrically connected to the display and the memory, wherein the processor may be configured to control the display to display a three-dimensional object, at least one two-dimensional object, and at least one first button corresponding to the at least one two-dimensional object, configure, in response to an input for selecting the at least one first button, the at least one two-dimensional object to be associated with at least a part of the three-dimensional object such that the at least one two-dimensional object moves in response to movement of at least a part of the three-dimensional object, and generate a first synthetic image including the three-dimensional object and the at least one two-dimensional object associated with at least a part of the three-dimensional object.

The processor according to an embodiment may be configured to reproduce the first synthetic image such that the at least one two-dimensional object moves in response to the movement of at least a part of the three-dimensional object.

The processor according to an embodiment may be configured to generate, if the at least one first button is not selected, a second synthetic image including the three-dimensional object and the at least one two-dimensional object that is not associated with at least a part of the three-dimensional object, and reproduce the second synthetic image such that at least a part of the three-dimensional object moves without movement of the at least one two-dimensional object.

The processor according to an embodiment may be further configured to configure, if the at least one two-dimensional object is a dynamic object, the at least one two-dimensional object to be associated with at least a part of the three-dimensional object such that a shape of the at least one two-dimensional object dynamically changes in response to the movement of at least a part of the three-dimensional object, and generate a third synthetic image including the three-dimensional object and the at least one two-dimensional object associated with at least a part of the three-dimensional object.

The processor according to an embodiment may be configured to control the display to display the three-dimensional object on a first area of a first screen and display the at least one two-dimensional object at a position overlapping or adjacent to a part of the three-dimensional object, control the display to display an object for selecting the three-dimensional object on a second area of the first screen, control the display to display an object for selecting the at least one two-dimensional object on the second area of the first screen, and control the display to display the at least one first button corresponding to the at least one two-dimensional object and at least one second button, and the at least one second button may be a button for specifying an additional movement corresponding to a gesture input.

The processor according to an embodiment may be configured to detect, in response to an input for selecting the at least one second button, an input of a specified gesture for moving another two-dimensional object that is not associated with the three-dimensional object, identify a movement path of the other two-dimensional object according to the input of the specified gesture, specify movement of the other two-dimensional object, based on the identified movement path, in the first synthetic image, and reproduce the first synthetic image such that the at least one two-dimensional object moves in response to the movement of at least a part of the three-dimensional object and such that the other two-dimensional object moves based on the identified movement path.

The processor according to an embodiment may be configured to control the display to display movement types for assigning movements to the three-dimensional object.

The processor according to an embodiment may be configured, if a position for associating the at least one two-dimensional object with the three-dimensional object changes, to control the display to display a visual effect at the changed position and to control the display to display text or an image indicating the changed position on the at least one first button.

The processor according to an embodiment may be configured, if the at least one two-dimensional object is selected by a specified gesture, to control the display to display a guide box on the at least one two-dimensional object and display the at least one two-dimensional object on the uppermost layer.

The electronic device according to an embodiment may further include a communication module configured to communicate with an external electronic device, and the processor may be configured to control the communication module to transmit information related to the first synthetic image and information related to an edit screen including the first synthetic image and the first button to the external electronic device such that the external electronic device displays the edit screen, identify a specified gesture for selecting or releasing the first button included in the edit screen, modify, if the first button displayed on the edit screen is released, the first synthetic image such that the at least one two-dimensional object associated with at least a part of the three-dimensional object included in the first synthetic image is not associated therewith, and control the communication module to transmit information related to the modified first synthetic image to the external electronic device.

A method of synthesizing a three-dimensional object and a two-dimensional object in the electronic device according to an embodiment described above will be described in detail with reference to the accompanying drawings.

Figure 5:
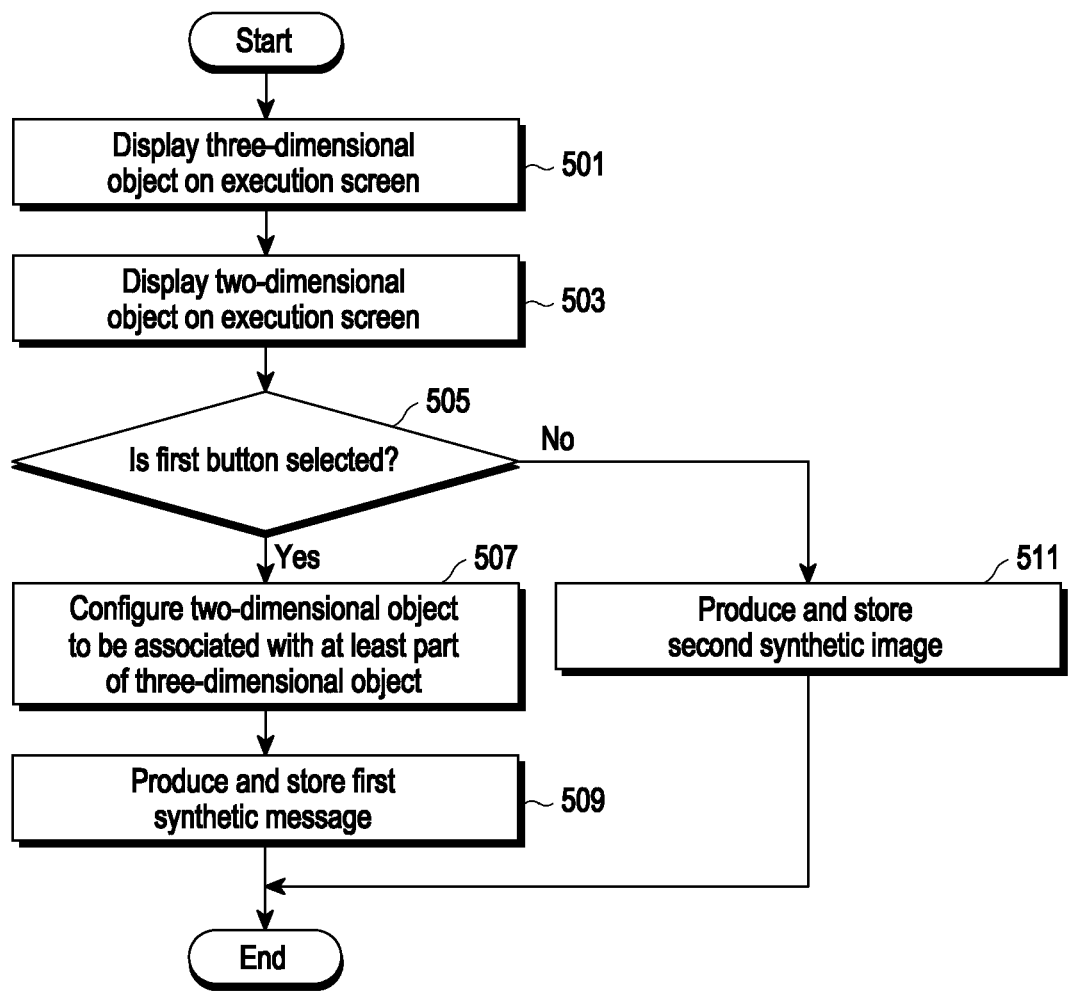
FIG. 5 is a diagram illustrating an operation of synthesizing a two-dimensional object with a three-dimensional object in an electronic device according to an embodiment.

FIG. 5 is a diagram illustrating an operation of synthesizing a two-dimensional object with a three-dimensional object in an electronic device according to an embodiment.

Referring to FIG. 5, an electronic device (e.g., the electronic device 101 in FIG. 1) according to an embodiment may select a three-dimensional (3D) object and display the selected three-dimensional object on an execution screen in operation 501.

In operation 503, the electronic device may select at least one two-dimensional object and display the selected at least one two-dimensional object to overlap or adjacent to at least a part of the three-dimensional object.

In operation 505, the electronic device may identify whether or not at least one first button, which is displayed on the execution screen to correspond to at least one two-dimensional object, is selected. If at least one first button is selected as a result of the identification in operation 505, the electronic device may perform operation 507, and if at least one first button is not selected, the electronic device may perform operation 511.

In operation 507, in response to selection of the at least one first button, the electronic device may configure at least one two-dimensional object to be associated with at least a part of the three-dimensional object such that the at least one associated two-dimensional object moves in response to movement of at least a part of the three-dimensional object. As an example, the electronic device may associate position information (e.g., coordinates (x, y)) of at least one two-dimensional object 313 with position information (e.g., coordinates (x, y)) of at least a part of the three-dimensional object.

In operation 509, the electronic device may generate and store a synthetic image (e.g., a first synthetic image) including the three-dimensional object and the at least one two-dimensional object associated with at least a part of the three-dimensional object. Thereafter, the operation may be terminated.

In operation 511, the electronic device may generate and store a synthetic image (e.g., a second synthetic image) including the three-dimensional object and at least one two-dimensional object that is not associated with at least a part of the three-dimensional object. Thereafter, the operation may be terminated.

In operation 509 described above in FIG. 5, if a play button displayed on the execution screen is selected before producing the first synthetic image, the electronic device may pre-reproduce the first synthetic image being edited. As an example, the electronic device may pre-reproduce the first synthetic image being edited such that at least one two-dimensional object moves in response to the movement of at least a part of the three-dimensional object.

In operation 511 described above in FIG. 5, if a play button displayed on the execution screen is selected before producing the second synthetic image, the electronic device may pre-reproduce the three-dimensional object before producing the second synthetic image. As an example, the electronic device may pre-reproduce the second synthetic image being edited such that a display position of at least one two-dimensional object, which is not associated with at least a part of the three-dimensional object, is maintained and such that at least a part of the three-dimensional object moves.

If a request to reproduce the first synthetic image or the second synthetic image produced in the above-described operations in FIG. 5 is input, the first synthetic image or the second synthetic image may be reproduced. As an example, when the first synthetic image is reproduced, the electronic device may reproduce the first synthetic image such that the at least one two-dimensional object moves in response to the movement of at least a part of the three-dimensional object.

Figure 6:
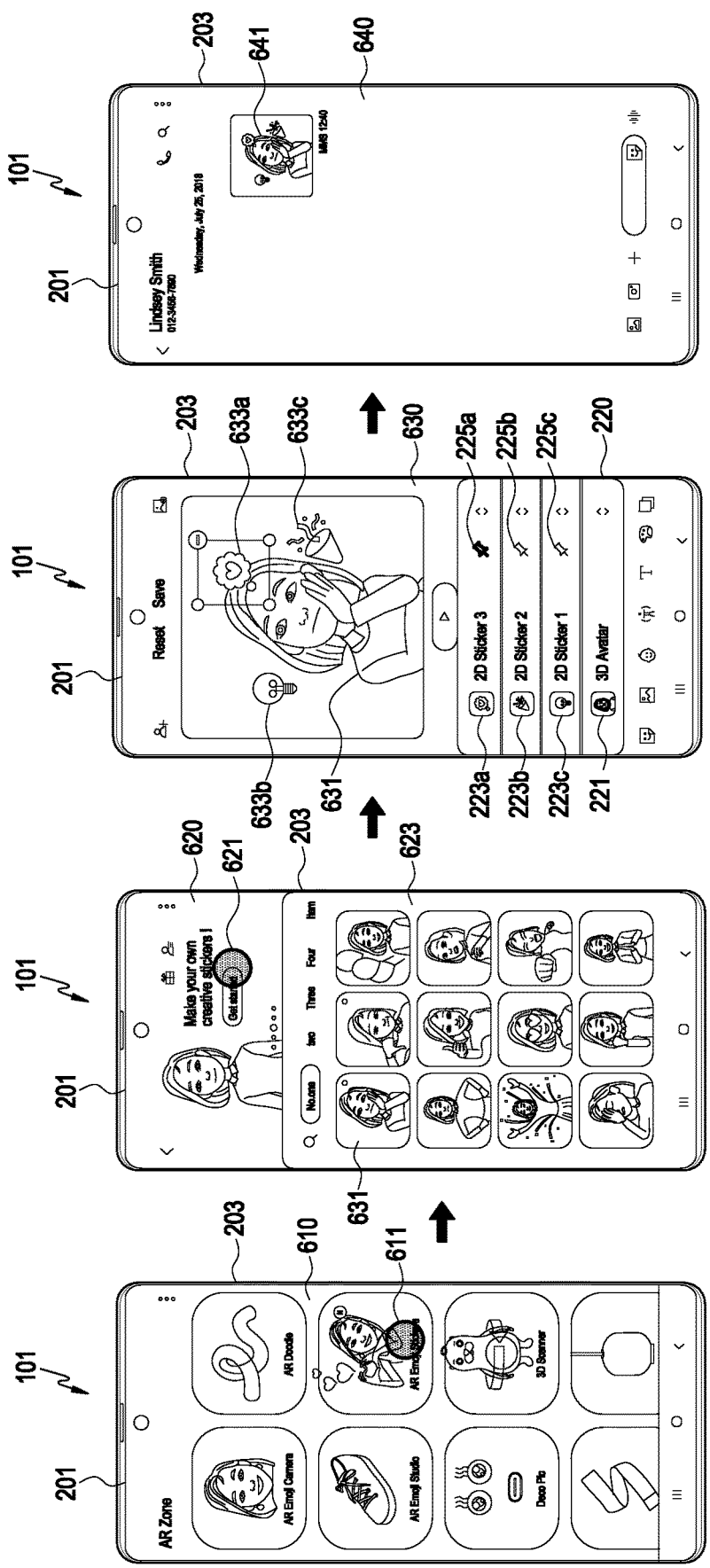
FIG. 6 is a diagram illustrating examples of operation screens for synthesizing a two-dimensional object with a three-dimensional object in an electronic device according to an embodiment.

FIG. 6 is a diagram illustrating examples of operation screens for synthesizing a two-dimensional object with a three-dimensional object in an electronic device according to an embodiment.

Referring to FIG. 6, if an application (e.g., function or program) 611 for image synthesis is selected from a first screen 610 displaying images (or icons) representing various applications, an electronic device 101 (e.g., the electronic device 101 in FIG. 1) according to an embodiment may execute the selected application 611 and display a second screen 620 for selecting a three-dimensional object.

If one of a plurality of three-dimensional objects displayed on the second screen 620 is selected, the electronic device 101 according to an embodiment may display a third screen 630 (e.g., the execution screen 203 in FIG. 2) for synthesizing at least one two-dimensional object with the selected three-dimensional object 631 and display the selected three-dimensional object 631 (e.g., the three-dimensional object 211 in FIG. 2) on the third screen 630. As an example, if two or more three-dimensional objects are selected from among the plurality of three-dimensional objects displayed on the second screen 630, the electronic device 101 may sequentially display the two or more selected three-dimensional objects on the third screen 630. As another example, the electronic device 101 may divide a first area 210 of the third screen 630 and display the two or more selected three-dimensional objects on the divided areas, respectively, and may configure the respective divided areas so as to be expanded or reduced.

The electronic device 101 according to an embodiment may display two-dimensional objects 633a, 633b, and 633c (e.g., the two-dimensional objects 213a, 213b, and 213c in FIG. 2) selected through objects 223a, 223b, and 223c for selecting two-dimensional objects, which are displayed on the second area 220 of the third screen 630, so as to overlap or be adjacent to at least a part of the three-dimensional object 631. If one of first buttons 225a, 225b, and 225c displayed corresponding to the objects 223a, 223b, and 223c is selected, the electronic device 101 may associate a two-dimensional object 633a corresponding to the selected first button 225a with at least a part of the three-dimensional object 631. The electronic device 101 may generate a first synthetic image including the three-dimensional object 631 and the two-dimensional object 633a associated with at least a part of the three-dimensional object 631, and store the generated first synthetic image in a memory (e.g., the memory 130 in FIG. 1). As an example, when two or more selected three-dimensional objects are displayed on the second screen 630, the electronic device 101 may sequentially or simultaneously synthesize at least one two-dimensional object with the two or more three-dimensional objects and consecutively reproduce a plurality of first synthetic images in which the two-dimensional objects are synthesized.

If all of the first buttons 225a, 225b, and 225c are not selected, the electronic device 101 according to an embodiment may generate a second synthetic image including the three-dimensional object 631 and two-dimensional objects 633a, 633b, and 633c that are not associated with at least a part of the three-dimensional object 631 and store the generated second synthetic image in the memory (e.g., the memory 130 in FIG. 1). As an example, when two or more selected three-dimensional objects are displayed on the second screen 630, the electronic device 101 may sequentially or simultaneously synthesize at least one two-dimensional object with the two or more three-dimensional objects and consecutively reproduce a plurality of second synthetic images in which the two-dimensional objects are synthesized. As another example, when two or more selected three-dimensional objects are displayed on the second screen 630, the electronic device 101 may sequentially synthesize at least one two-dimensional object with the two or more three-dimensional objects. The electronic device 101 may generate a first synthetic image in which at least one two-dimensional object is associated with at least one three-dimensional object, generate a second synthetic image in which at least one two-dimensional object is not associated with at least one other three-dimensional object, and consecutively reproduce the generated first synthetic image and second synthetic image.

The electronic device according to an embodiment may utilize the generated synthetic message 641 (e.g., a first synthetic message or a second synthetic message) in another application. The electronic device may execute another application (e.g., a message transmission/reception-related application, an augmented reality-related application, or an Internet shopping-related application) and display the generated synthetic message 641 on an execution screen of another application. As an example, the electronic device 101 may transmit the synthetic message 641 to another electronic device (or user) using a message transmission/reception-related application as shown in (d) of FIG. 6 and display the transmitted synthetic message 641 on a fourth screen 640 that is an execution screen of the message transmission/reception-related application. As an example, if the transmitted synthetic message 641 is the first synthetic image, the electronic device 101 may reproduce the first synthetic image such that at least one two-dimensional object 633a moves in response to movement of at least a part of the three-dimensional object 631. As an example, if the transmitted synthetic message 641 is the second synthetic image, the electronic device 101 may reproduce the same such that at least a part of the three-dimensional object 631 moves and such that at least one two-dimensional object (at least one of 633a, 633b, or 633c) remains at a display position thereof without moving.

Figure 7A:
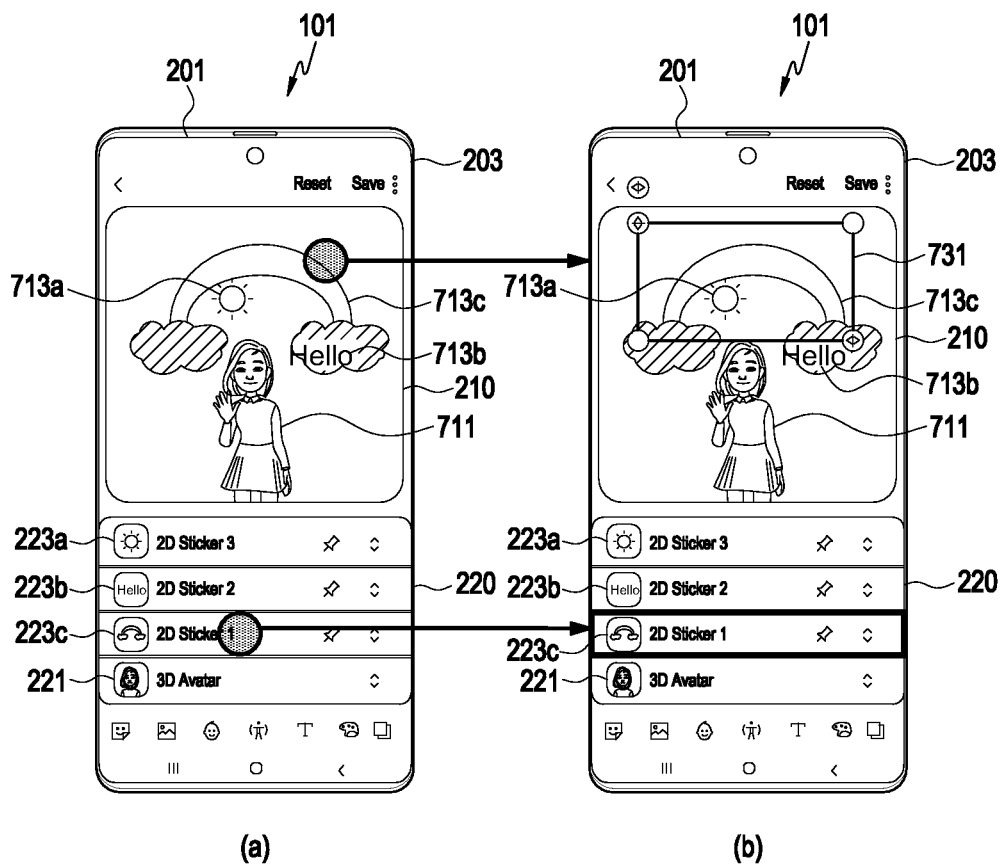
FIGS. 7A and 7B are diagrams illustrating an example of a screen for synthesizing a two-dimensional object with a three-dimensional object in an electronic device according to an embodiment.
Figure 7B:
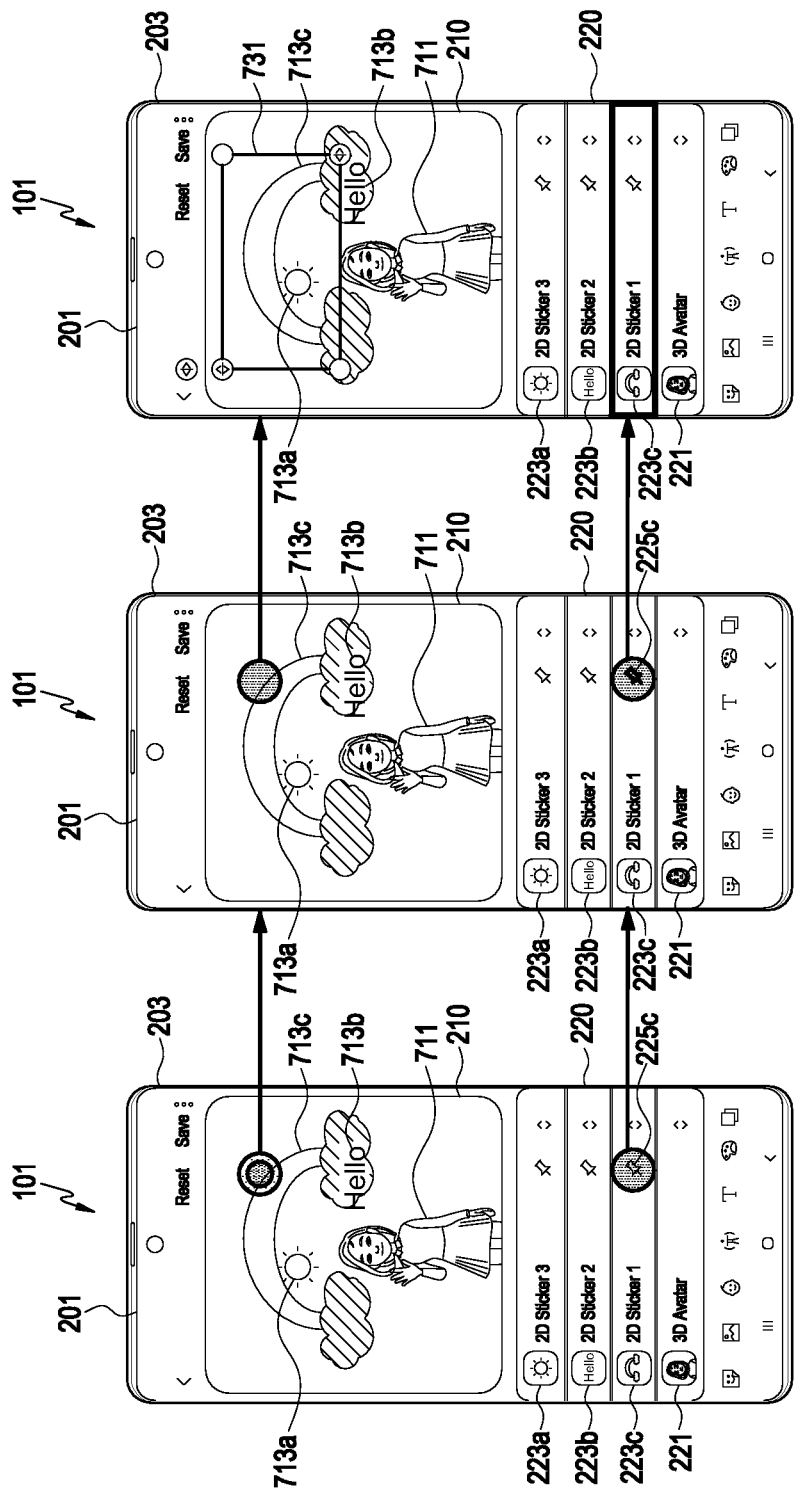

FIGS. 7A and 7B are diagrams illustrating an example of a screen for synthesizing a two-dimensional object with a three-dimensional object in an electronic device according to an embodiment.

Referring to FIGS. 7A and 7B, an electronic device 101 (e.g., the electronic device 101 in FIG. 1) according to an embodiment may display a three-dimensional object 711 on the first area 210 of the execution screen 203 (e.g., the execution screen 630 in FIG. 6) and, if objects 223*a*, 223*b*, and 223*c* for selecting two-dimensional objects displayed on the second area 220 of the execution screen 203 are selected, display two-dimensional objects 713*a*, 713*b*, and 713*c* as indicated by the selected objects 223*a*, 223*b*, and 223*c* so as to overlap or be adjacent to at least a part of the three-dimensional object 711. If one two-dimensional object 713*c* of the two-dimensional object 713*a*, 713*b* and 713*c* or one object 223*c* of the objects 223*a*, 223*b*, and 223*c* for selecting the two-dimensional objects is selected, the electronic device 101 may display a guide box 731 for editing the two-dimensional object 713*c*. The electronic device 101 may edit (e.g., adjust the size and shape) of the two-dimensional object 713*c* using the guide box 731.

Referring to FIG. 7B, if one two-dimensional object 713*c* of the two-dimensional objects 713*a*, 713*b*, and 713*c* or one first button 225*c* of the first buttons 225*a*, 225*b*, and 225*c* displayed respectively corresponding to the objects 223*a*, 223*b*, and 223*c* for selecting the two-dimensional objects is selected, the electronic device 101 (e.g., the electronic device 101 in FIG. 1) according to an embodiment may display the selected first button 225*a* in an on state. As an example, if one two-dimensional object 713*c* is selected from among the two-dimensional objects 713*a*, 713*b*, and 713*c* by a long-press gesture, the electronic device may identify that the first button 225*c* has been selected and display the first button 225*c* in the on state.

If one two-dimensional object 713*c* of the two-dimensional objects 713*a*, 713*b*, and 713*c* or one first button 225*c* of the first buttons 225*a*, 225*b*, and 225*c* displayed respectively corresponding to the objects 223*a*, 223*b*, and 223*c* for selecting the two-dimensional objects is selected, the electronic device 101 according to an embodiment may identify that the first button 225*c* has been selected, display the first button 225*c* in an off state, and display a guide box 731 for editing the two-dimensional object 713*c*. The electronic device 101 may edit (e.g., adjust the size and shape) of the two-dimensional object 713*c* using the guide box 731. As an example, if one two-dimensional object 713*c* is selected from among the two-dimensional objects 713*a*, 713*b*, and 713*c* by a short-press gesture, the electronic device may identify that the first button 225*c* has been selected and may display the first button 225*c* in the off state.

Figure 8:
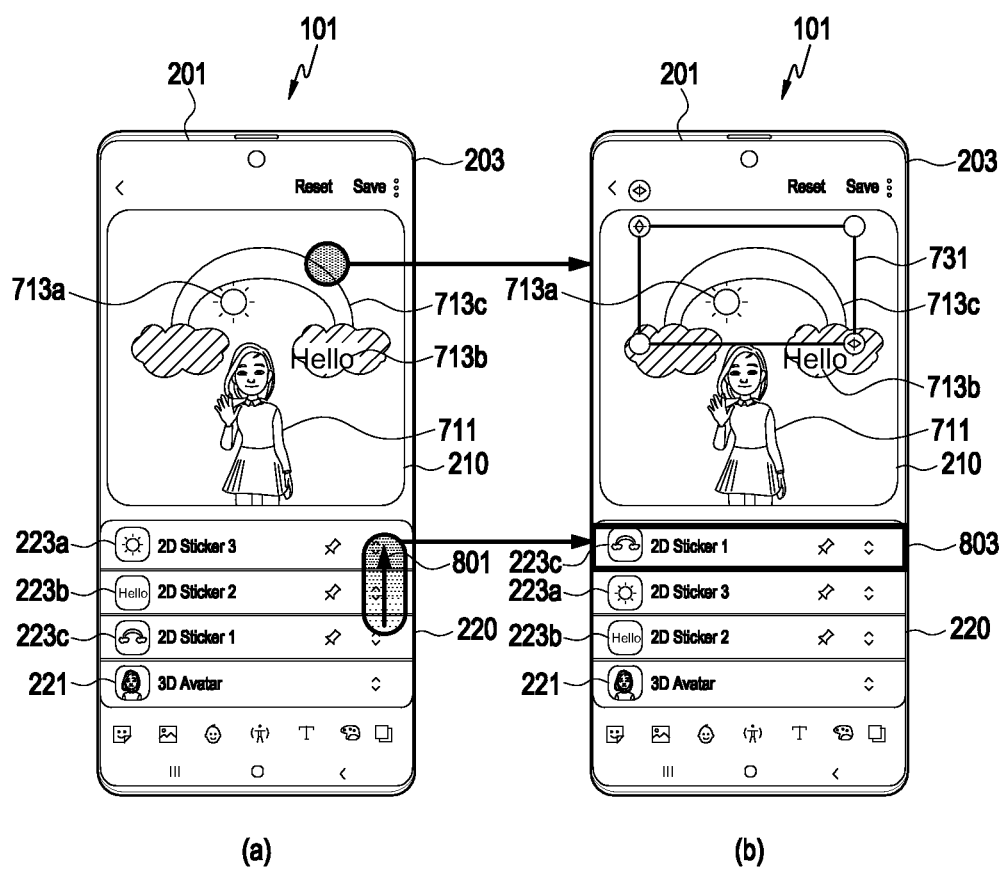
FIG. 8 is a diagram illustrating an example of a screen for synthesizing a two-dimensional object with a three-dimensional object in an electronic device according to an embodiment.

FIG. 8 is a diagram illustrating an example of a screen for synthesizing a two-dimensional object with a three-dimensional object in an electronic device according to an embodiment.

Referring to FIG. 8, an electronic device 101 (e.g., the electronic device 101 in FIG. 1) according to an embodiment may detect an input of a gesture 801 for moving the display position of one object 223*c* among objects 223*a*, 223*b*, and 223*c* for selecting two-dimensional objects displayed on a second area 220 of an execution screen 203 (e.g., the execution screen 630 in FIG. 6) using at least one sensor (e.g., at least one of a touch sensor, a motion sensor, a pressure sensor, a gyro sensor, or a camera sensor). If the gesture 801 for moving the display position of the object 223*c* is input, the electronic device 101 may display the object 223*c* to be located at a first position 803 corresponding to the uppermost position in the list and change the layer of the two-dimensional object 713*c* indicated by the object 223*c* to be located at the first position 803. The electronic device 101 may display a guide box 731 for editing the two-dimensional object 713*c*.

Figure 9:
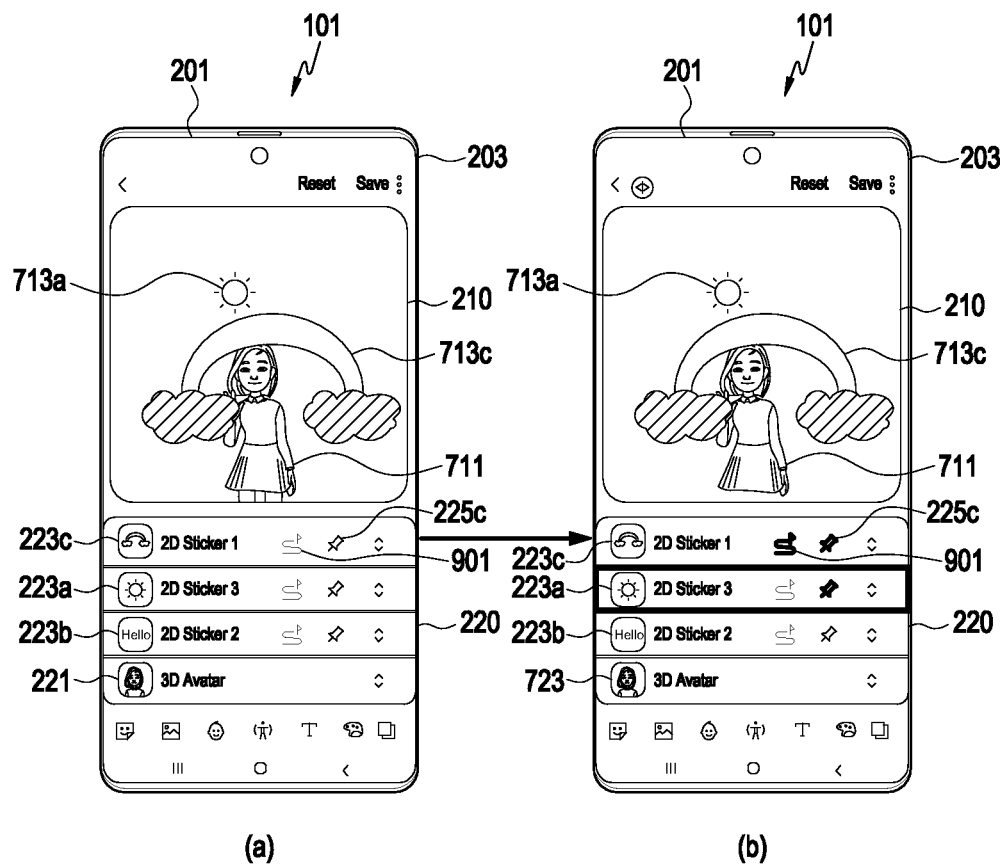
FIG. 9 is a diagram illustrating an example of a screen for synthesizing a two-dimensional object with a three-dimensional object in an electronic device according to an embodiment.

FIG. 9 is a diagram illustrating an example of a screen for synthesizing a two-dimensional object with a three-dimensional object in an electronic device according to an embodiment.

Referring to FIG. 9, an electronic device 101 (e.g., the electronic device 101 in FIG. 1) according to an embodiment may display a three-dimensional object 711 in a first area 210 of an execution screen 203 (e.g., the execution screen 630 in FIG. 6) and, if objects 223*a*, 223*b*, and 223*c* for selecting two-dimensional objects displayed on a second area 220 of the execution screen 203 are selected, display two-dimensional objects 713*a*, 713*b*, and 713*c* as indicated by the selected objects 223*a*, 223*b*, and 223*c* so as to overlap or be adjacent to at least a part of the three-dimensional object 711. If a first button 225*c* is selected, the electronic device 101 may associate the two-dimensional object 713*a* indicated by the object 223*c* displayed corresponding to the first button 225*c* with at least a part of the three-dimensional object 711. If a second button 901 (e.g., the second button 227 in FIG. 2) to configure an additional movement of the associated two-dimensional object 713*c* is selected, the electronic device 101 may display the second button 901 in an on state and detect a specified gesture input (e.g., drag and drop) for moving the two-dimensional object 713*c* using at least one sensor (e.g., at least one of a touch sensor, a motion sensor, or a pressure sensor).

Figure 10:
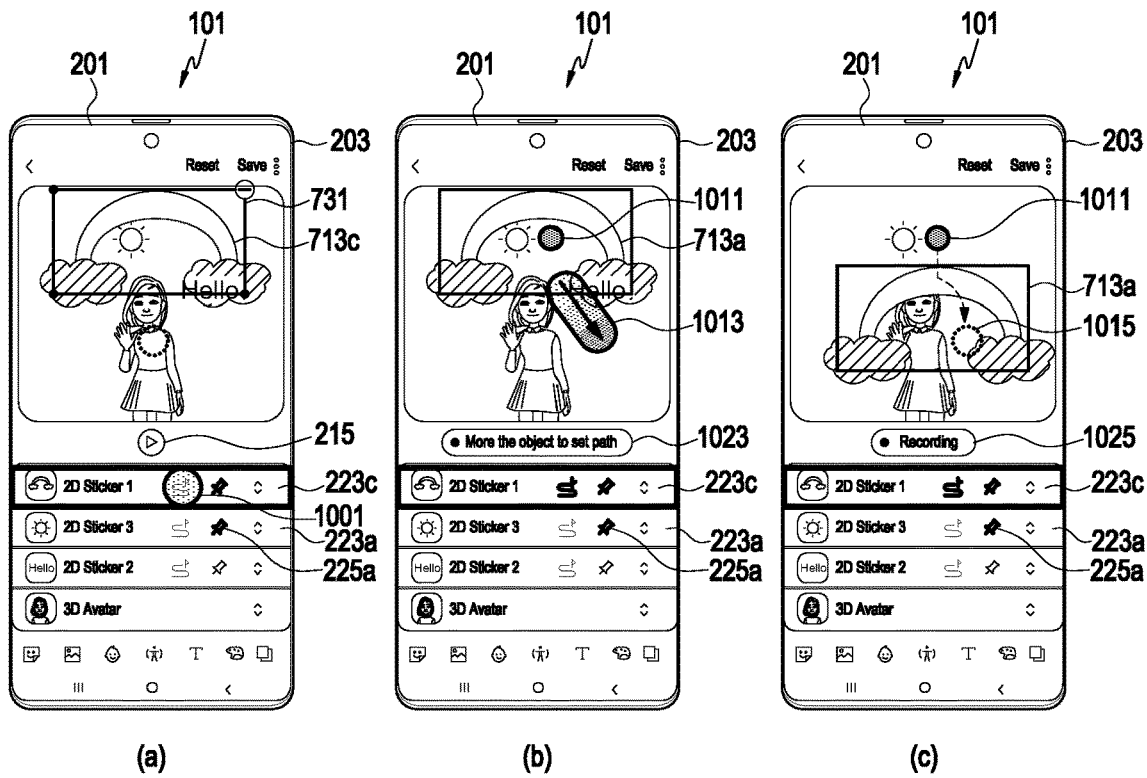
FIG. 10 is a diagram illustrating an example of a screen for synthesizing a two-dimensional object with a three-dimensional object in an electronic device according to an embodiment.
Figure 10:
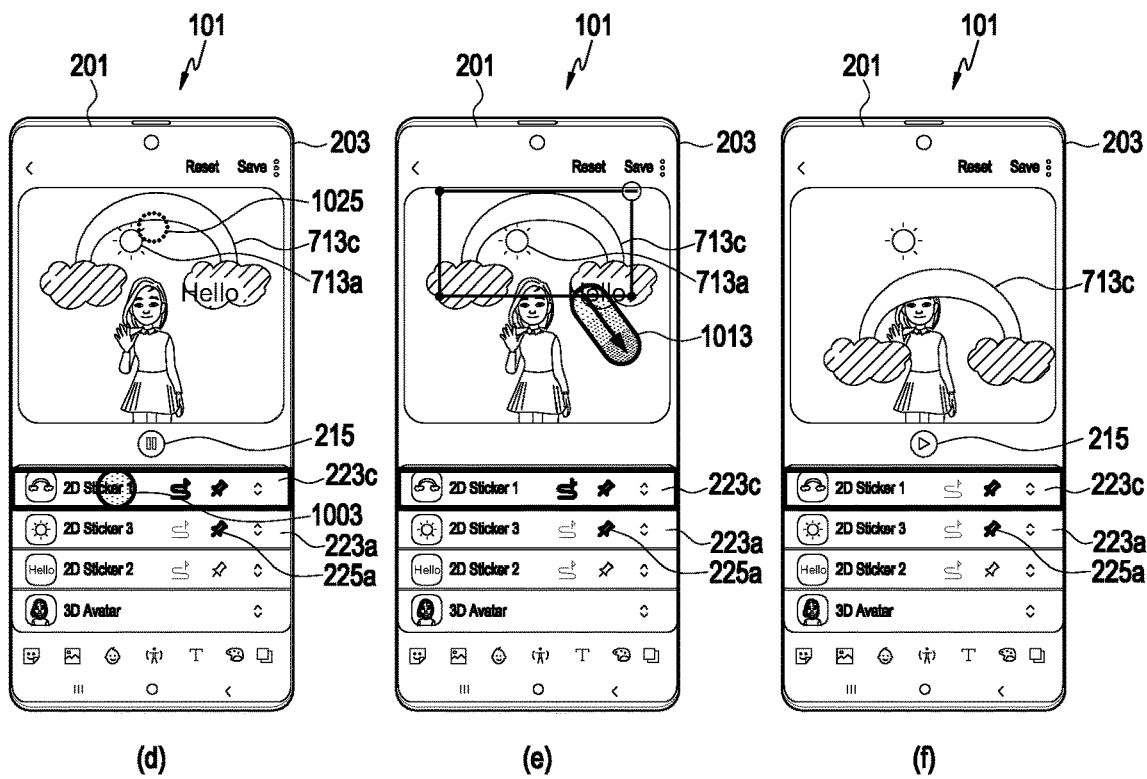

FIG. 10 is a diagram illustrating an example of a screen for synthesizing a two-dimensional object with a three-dimensional object in an electronic device according to an embodiment.

Referring to FIG. 10, if an object 223*c* displayed on an execution screen 201 is selected by a specified gesture or if a two-dimensional object 713*c* indicated by the object 223*c* is selected, an electronic device 101 (e.g., the electronic device 101 in FIG. 1) according to an embodiment may display a guide box 731 on the two-dimensional object 713*c*. If a second button 1001 (e.g., the second button 227 in FIG. 2) to configure an additional movement of the associated two-dimensional object 713*c* is selected as shown in (a) of FIG. 10, the electronic device 101 may display the second button 1001 in an on state as shown in (b) of FIG. 10. The electronic device 101 may receive a gesture input (e.g., drag and drop) 1013 for moving the two-dimensional object 713*c* as shown in (b) of FIG. 10, may move the two-dimensional object 713*c* from a position 1011 where the two-dimensional object 713*c* is displayed to a movement position 1015 and display the same as shown in (c) of FIG. 10, and store position information (coordinates (x, y)) of the movement path of the two-dimensional object 713*c* in a memory (e.g., the memory 130 in FIG. 1). If a first button 225*a* displayed on a second area 220 of the execution screen 203 is selected, the electronic device 101 may associate a two-dimensional object 713*a* indicated by the selected object 223*a* with at least a part of the three-dimensional object 711.

If a play button 215 displayed on the execution screen 203 is selected, the electronic device 101 according to an embodiment, as shown in (e) of FIG. 10, may reproduce movement such that the two-dimensional object 713*a* associated with the three-dimensional object 711 moves according to the movement of the three-dimensional object 711 and such that the two-dimensional object 713*a* moves based on the position information of the movement path of the two-dimensional object 713*c* stored in the memory. If the reproduction is completed, the electronic device 101 may display the two-dimensional object 713c at a position where the movement thereof is completed as shown in (0 of FIG. 10.

Figure 11A:
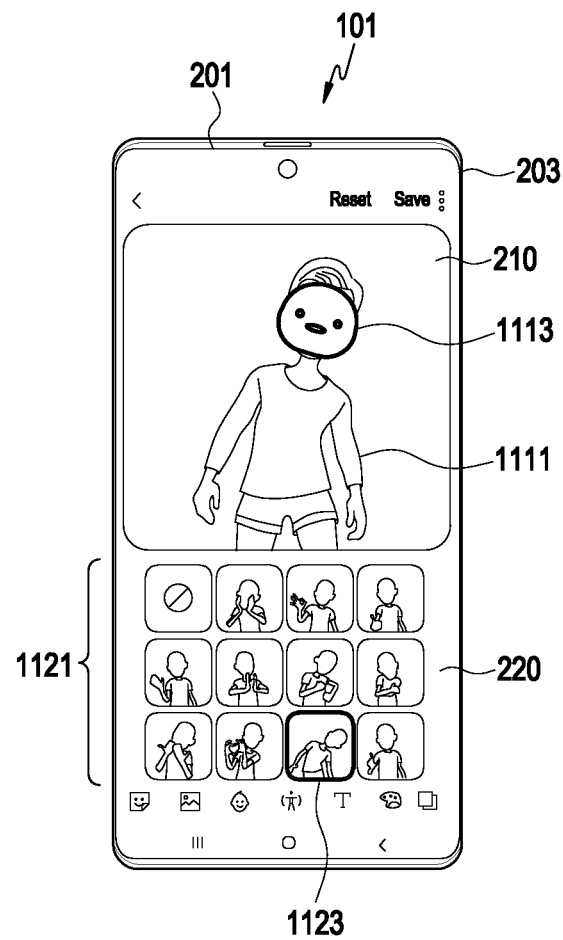
FIGS. 11A-11C are diagrams illustrating an example of a screen for synthesizing a two-dimensional object with a three-dimensional object in an electronic device according to an embodiment.
Figure 11B:
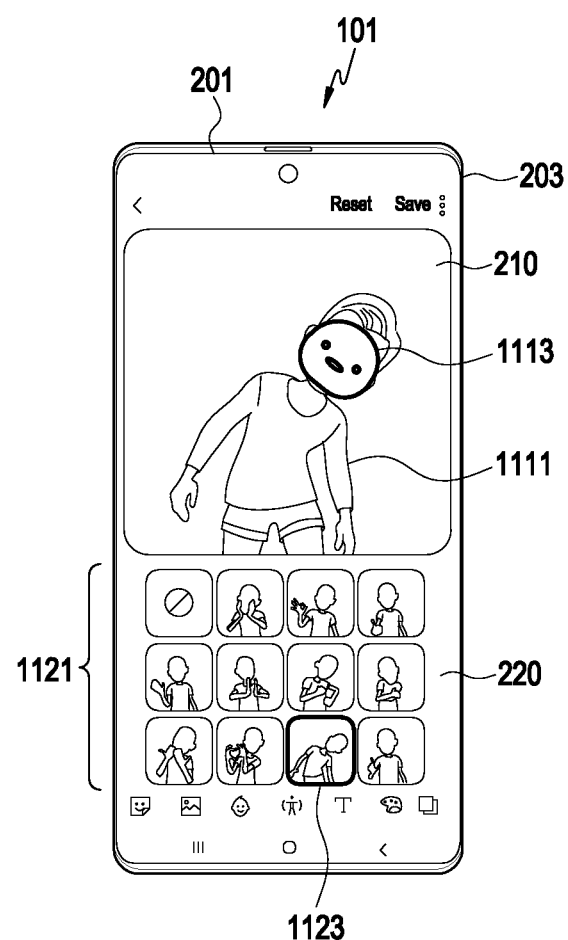
Figure 11C:
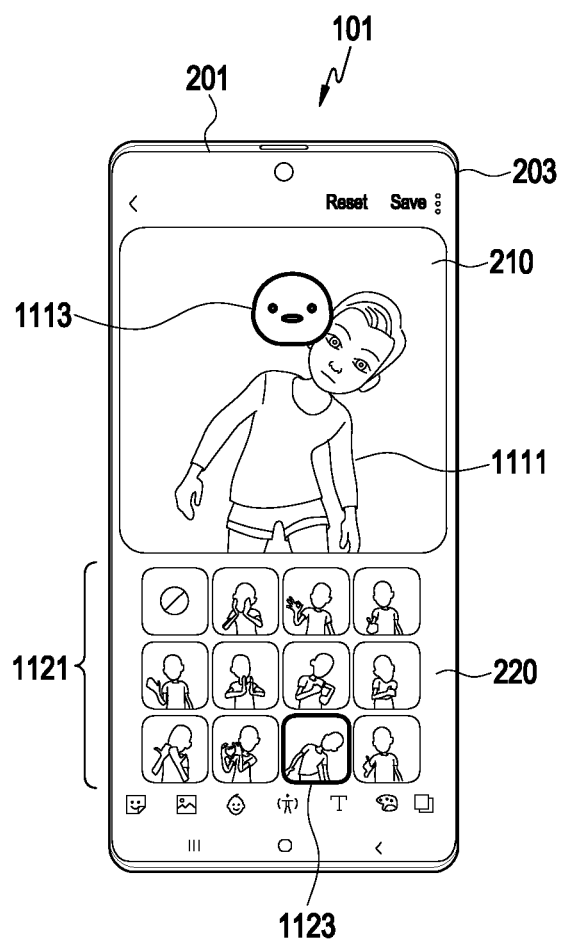

FIGS. 11A, 11B, and 11C are diagrams illustrating an example of a screen for synthesizing a two-dimensional object with a three-dimensional object in an electronic device according to an embodiment.

Referring to FIG. 11A, an electronic device 101 (e.g., the electronic device 101 in FIG. 1) according to an embodiment may display, on a first area 210 of an execution screen 203, a three-dimensional object 1111 and a two-dimensional object 1113 to overlap or be adjacent to at least a part of the three-dimensional object 1111. If a menu (e.g., the menu 234 in FIG. 2) displayed on a third area (e.g., the third area 230 in FIG. 2) of the execution screen 203 is selected, the electronic device 101 may display, on a second area 220, movement images 1121 as movement types representing various movements so as to assign movements to the three-dimensional object 1111. If one movement image 1123 is selected from among the movement images 1121, the electronic device 101 may assign a movement configured in the selected movement image 1123 to the three-dimensional object 1111.

Referring to FIGS. 11B and 11C, an electronic device 101 (e.g., the electronic device 101 in FIG. 1) according to an embodiment may assign a movement configured in the selected movement image 1123 to the three-dimensional object 1111 and move at least a part of the three-dimensional object according to the movement configured in the movement image 1123. If a two-dimensional object 1113 is associated with at least a part of the three-dimensional object 1111, the electronic device 101 may move the associated two-dimensional object 1113 according to the movement of at least a part of the three-dimensional object 1111 as shown in FIG. 11B. If the two-dimensional object 1113 is not associated with at least a part of the three-dimensional object 1111, the electronic device 101 may move at least a part of the three-dimensional object 1111 while maintaining the display position of the two-dimensional object 1113 without moving the same as shown in FIG. 11C. As an example, if two or more movement images are selected from among the images 1121 representing various movements, the electronic device 101 may assign a movement configured in each of the selected movement images to the three-dimensional object 1111. The electronic device 101 may consecutively perform the movements respectively configured in the movement images selected for the three-dimensional object 1111. As an example, if the movements configured in the movement images selected for the three-dimensional object 1111 correspond to different parts of the three-dimensional object 1111, the electronic device 101 may associate a plurality of two-dimensional objects with different parts (e.g., the head and hands) of the three-dimensional object 1111. If a play button (not shown) is selected or if a specified gesture instructing reproduction is input, the electronic device 101 may respectively move the plurality of two-dimensional objects associated with different parts in response to the movement of the three-dimensional object 1111. As an example, if a play button (not shown) is selected or if a specified gesture instructing reproduction is input, the electronic device 101 may sequentially and consecutively move the three-dimensional object 1111, based on the images 1121 representing various movements displayed on the second area 220. If at least part of the three-dimensional object 1111 associated with the two-dimensional object moves while the three-dimensional object 1111 is sequentially and consecutively moving based on the images 1121, the electronic device 101 may move the associated two-dimensional object in response to the movement of at least a part of the three-dimensional object 1111.

Figure 12A:
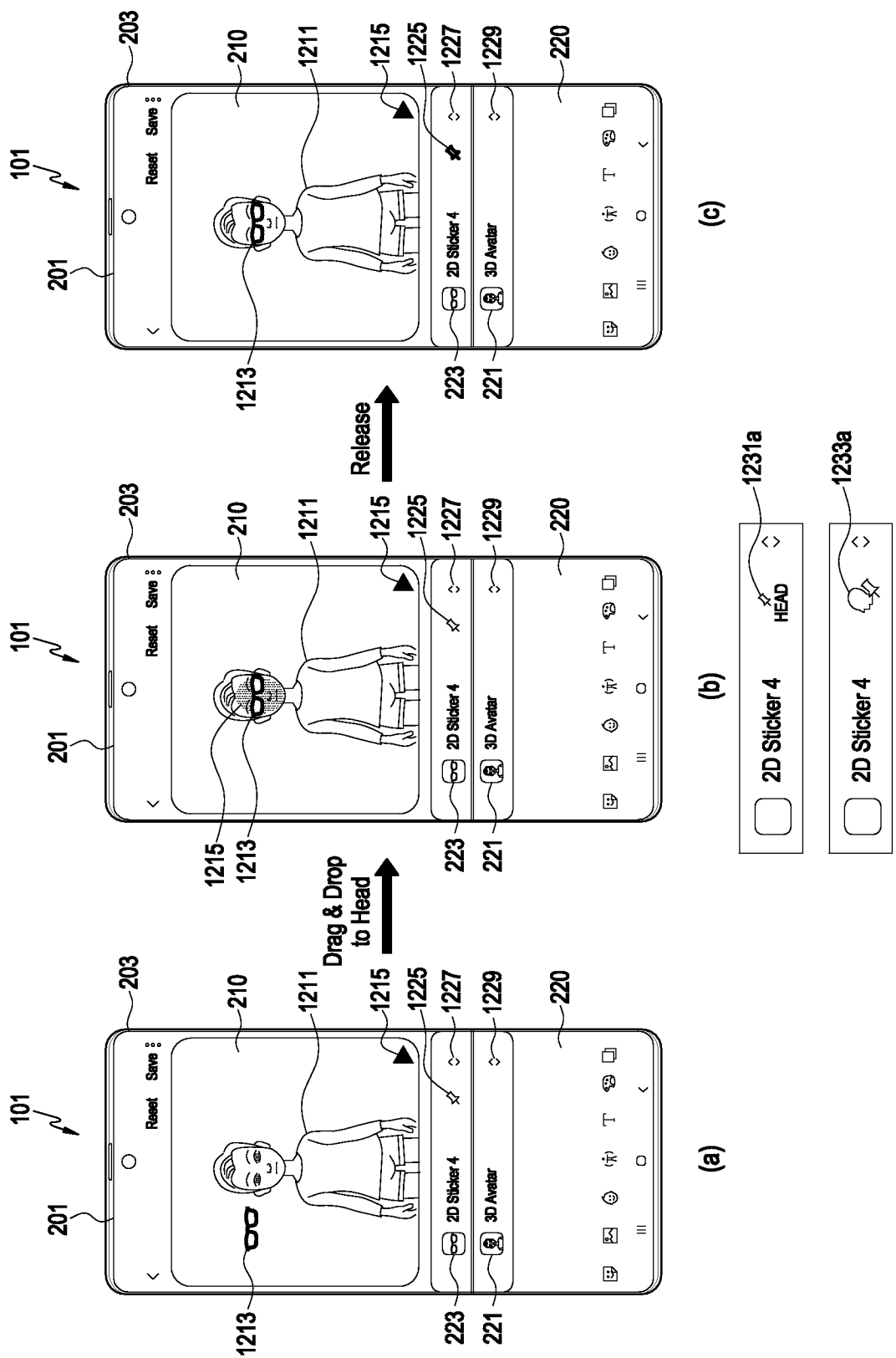
FIGS. 12A and 12B are diagrams illustrating an example of a screen for synthesizing a two-dimensional object with a three-dimensional object in an electronic device according to an embodiment.
Figure 12B:
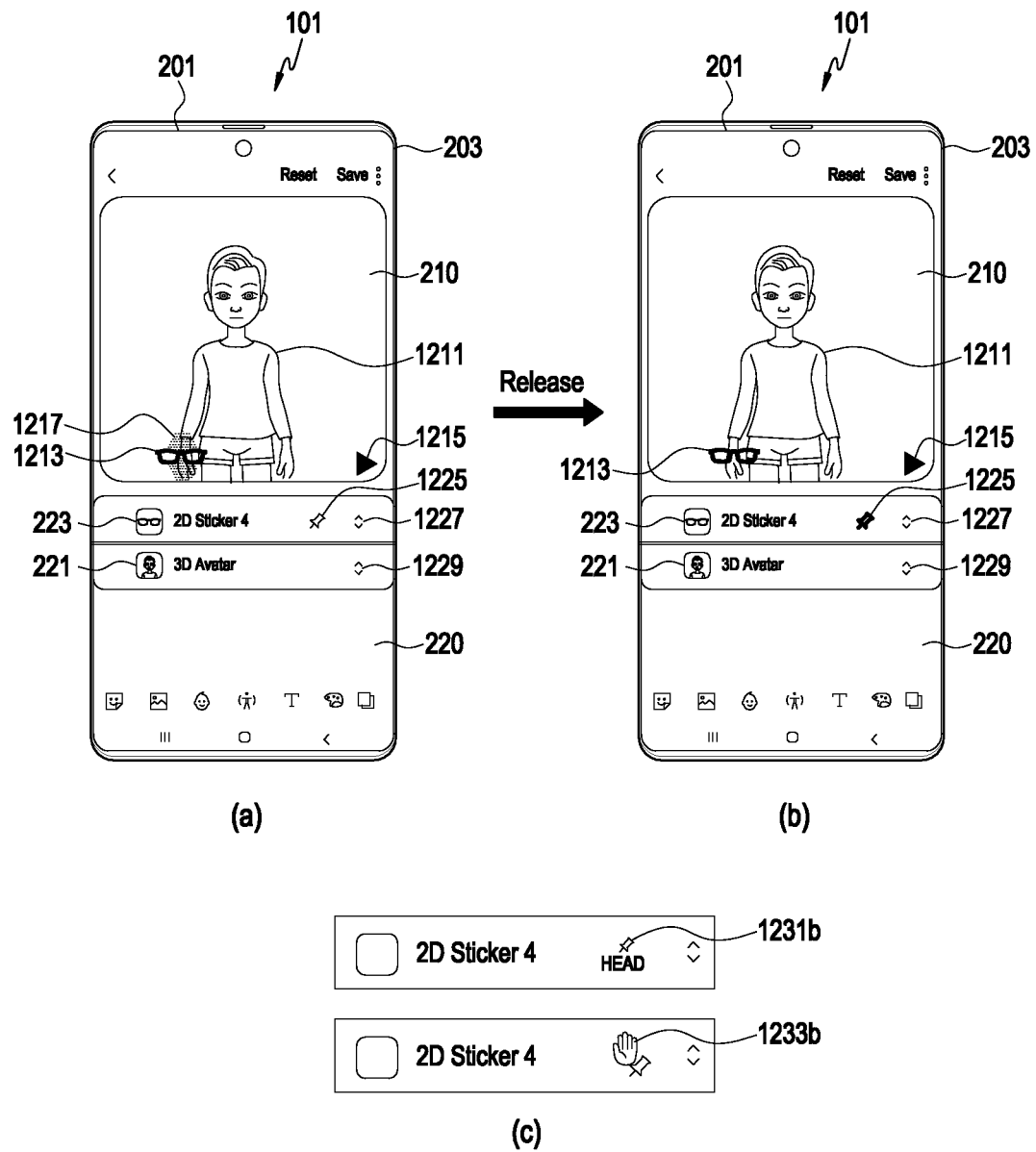

FIGS. 12A and 12B are diagrams illustrating an example of a screen for synthesizing a two-dimensional object with a three-dimensional object in an electronic device according to an embodiment.

Referring to FIG. 12A, an electronic device 101 (e.g., the electronic device 101 in FIG. 1) according to an embodiment may display a three-dimensional object 1211 on a first area 210 of an execution screen 203 (e.g., the execution screen 630 in FIG. 6). As shown in (a) of FIG. 12A, in response to selection of one object 223 (e.g., a two-dimensional sticker 4) from among objects (e.g., the objects 223 in FIG. 2) for selecting two-dimensional objects, which are displayed on a second area 220 of the execution screen 203, the electronic device 101 may display a two-dimensional object 1213 indicated by the selected object 223 so as to overlap or be adjacent to at least a part of the three-dimensional object 1211. As shown in (b) of FIG. 12A, if the electronic device 101 identifies movement of the two-dimensional object 1213 by a specified user gesture (e.g., drag and drop), the electronic device 101 may identify the movement position (e.g., coordinates (x, y)) and display a visual effect 1215 at the identified position such that the two-dimensional object 1213 is associated with at least a part of the three-dimensional object 1211. As shown in (c) of FIG. 12A, the electronic device 101 may identify that the specified user gesture (e.g., drag and drop) is released and associate the two-dimensional object 1213 with the movement position corresponding to at least part of the three-dimensional object 1211. As an example, the electronic device 101 may display, if the movement position of the two-dimensional object 1213 corresponds to the face area of the three-dimensional object 1211, a visual effect 1215 on the face area of the three-dimensional object 1211 and, if the specified gesture is released, associate the two-dimensional object 1213 with the face area of the three-dimensional object 1211. When the specified gesture is released, the electronic device 101 may display a first button 1225 (e.g., the first button 225 in FIG. 2), which is displayed corresponding to the object 223 associated with the two-dimensional object 1213, in an on state. As another example, if the first button 1225 is selected after the specified gesture is released, the electronic device 101 may display the first button 1225 in the on state and associate the two-dimensional object 1213 with the face area of the three-dimensional object 1211. As an example, as shown in (d) of FIG. 12A, the electronic device 101 may display another visual effect 1231a or 1233a related to the face area on the first button 1225 as the two-dimensional object 1213 is associated with the face area of the three-dimensional object 1211.

Referring to FIGS. 12A and 12B, the electronic device 101 (e.g., the electronic device 101 in FIG. 1) according to an embodiment, as shown in (a) of FIG. 12A, may display the two-dimensional object 1213 indicated by the object 223 so as to overlap or be adjacent to at least a part of the three-dimensional object 1211. As shown in (a) of FIG. 12B, if movement of the two-dimensional object 1213 is identified by a specified user gesture (e.g., drag and drop), the electronic device 101 may identify the movement position (e.g., coordinates (x, y)) and display a visual effect 1215 at the identified position such that the two-dimensional object 1213 is associated with at least a part of the three-dimensional object 1211. As shown in (b) of FIG. 12B, the electronic device 101 may identify that the specified user gesture (e.g., drag and drop) is released and associate the two-dimensional object 1213 with the movement position, which is at least a part of the three-dimensional object 1211. As an example, if the movement position of the two-dimensional object 1213 corresponds to the hand area of the three-dimensional object 1211, the electronic device 101 may display a visual effect 1217 on the hand area of the three-dimensional object 1211 and associate the two-dimensional object 1213 with the hand area of the three-dimensional object 1211 when the specified gesture is released. When the specified gesture is released, the electronic device 101 may display the first button 1225, which is displayed corresponding to the object 223 associated with the two-dimensional object 1213, in an on state. As another example, if the first button 1225 is selected after the specified gesture is released, the electronic device 101 may display the first button 1225 in the on state and associate the two-dimensional object 1213 with the hand area of the three-dimensional object 1211. As an example, as shown in (c) of FIG. 12B, the electronic device 101 may display another visual effect 1231b or 1233b related to the hand area on the first button 1225 as the two-dimensional object 1213 is associated with the hand area of the three-dimensional object 1211.

The electronic device 101 according to an embodiment may display an object 1227 and an object 1229 for displaying the objects to be expanded or reduced to correspond to an object 221 for selecting the three-dimensional object and an object 223 for selecting the two-dimensional object, which are displayed on the second area 220 of the execution screen 203. As an example, if the object 1227 is selected, the electronic device 101 may display a plurality of two-dimensional objects by expanding the area displaying the two-dimensional object 223. If the object 1227 is selected again, the electronic device 101 may display only the selected two-dimensional object 223 by reducing the area displaying the plurality of two-dimensional objects. As an example, if the object 1229 is selected, the electronic device 101 may display a plurality of three-dimensional objects by expanding the area displaying the three-dimensional object 221. If the object 1229 is selected again, the electronic device 101 may display only the selected three-dimensional object 221 by reducing the area displaying the plurality of three-dimensional objects.

Figure 13A:
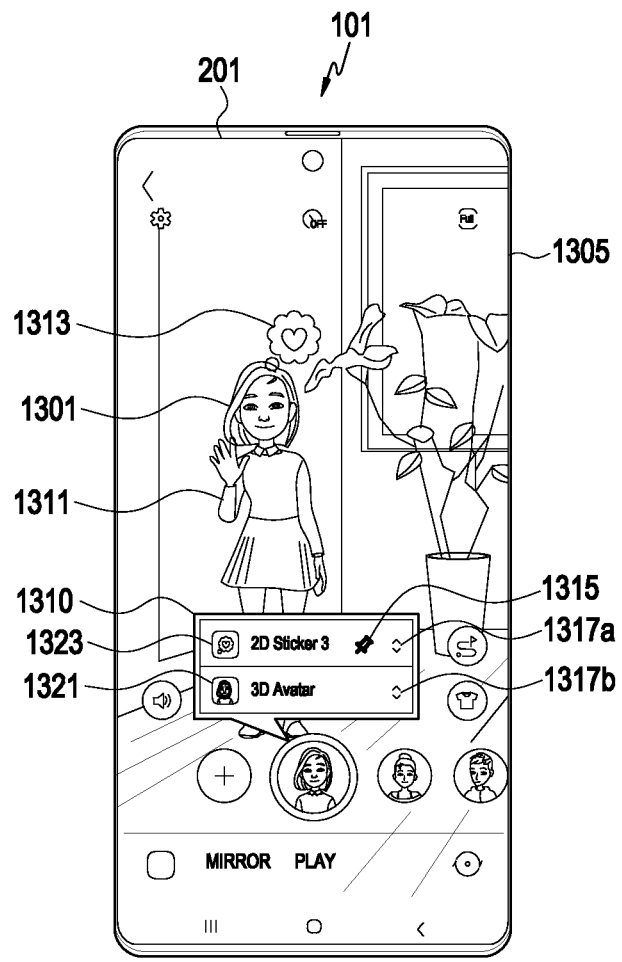
FIGS. 13A-13C are diagrams illustrating an example of a screen for synthesizing a two-dimensional object with a three-dimensional object in an electronic device according to an embodiment.
Figure 13B:
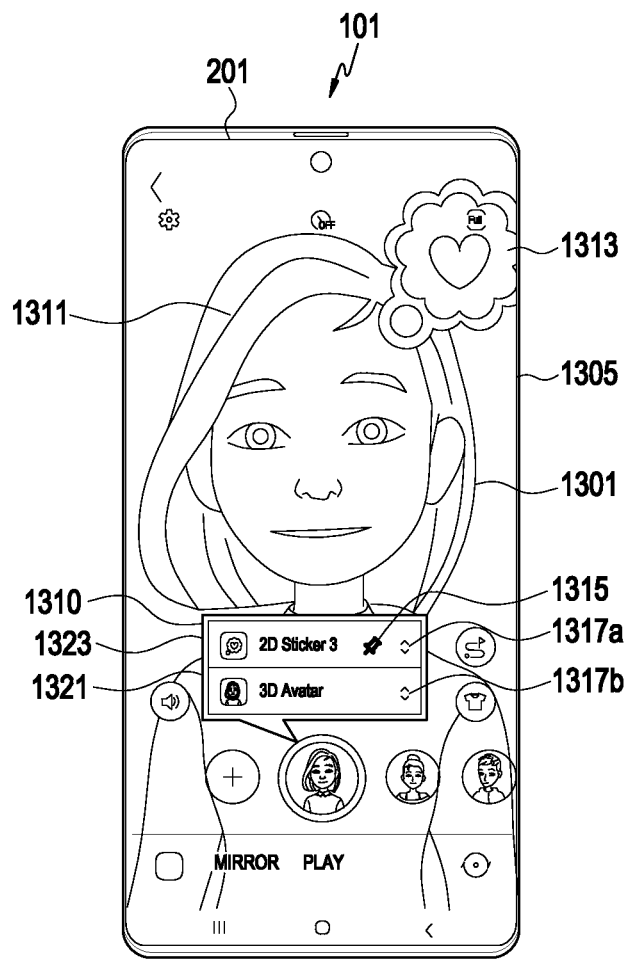
Figure 13C:
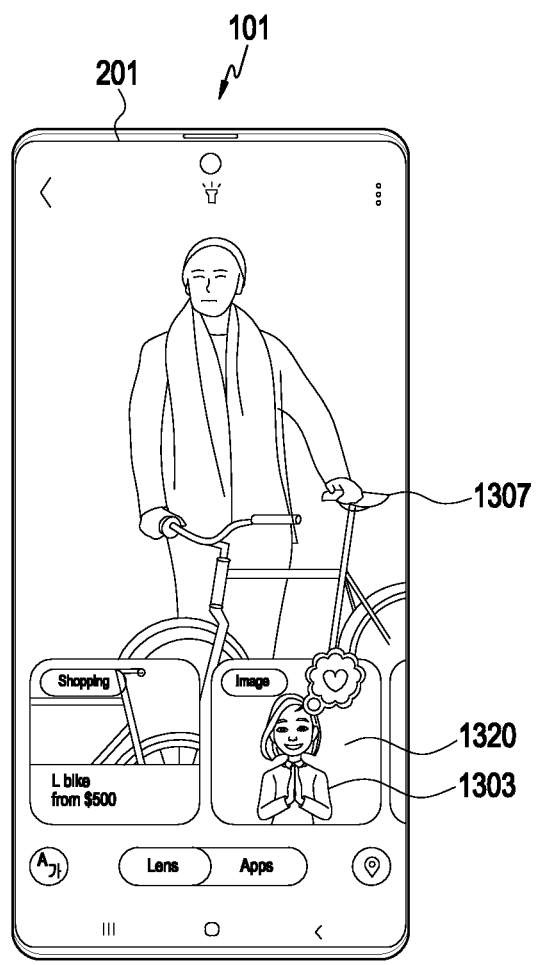

FIGS. 13A to 13C are diagrams illustrating an example of a screen for synthesizing a two-dimensional object with a three-dimensional object in an electronic device according to an embodiment.

Referring to FIGS. 13A, 13B, and 13C, an electronic device 101 (e.g., the electronic device 101 in FIG. 1) according to an embodiment may display or activate a synthetic image 1301 or 1303 in which a two-dimensional object is synthesized with a three-dimensional object in another application (e.g., AR camera or Bixby vision). When displaying or activating the synthetic image 1301 or 1303 on an execution screen 1305 and 1307 of another application, the electronic device 101 may display an edit screen 1310 or 1320 for editing the synthetic image 1301 or 1303 so as to overlap the same on the execution screen 1305 or 1307. As an example, the edit screen 1310 may include an object 1321 for selecting a three-dimensional object 1311 and an object 1323 for selecting a two-dimensional object 1313, and display objects 1317a and 1317b for expanding the object 1321 and the object 1323 so as to correspond to the object 1321 and the object 1323, respectively. If the object 1317a is selected, the electronic device may expand the object 1321 and display a plurality of three-dimensional objects in the form of, for example, a list. If the object 1317b is selected, the electronic device 101 may expand the object 1323 and display a plurality of two-dimensional objects in the form of, for example, a list. As an example, the edit screen 1320 may provide an interface interworking with an application for editing and producing a synthetic image. As an example, if the synthetic image 1303 is selected by the user, the electronic device 101 may display the synthetic image 1303 on the execution screen 1307 and display a screen such as the edit screen 1310 for editing the synthetic image 1303. As another example, if the synthetic image 1303 is selected by the user, the electronic device may interwork with an application for editing or producing the synthetic image 1303, thereby executing the application, or may obtain information related to the synthetic image 1303.

The electronic device 101 according to an embodiment may indicate, if the first button 1315 included in the displayed edit screen 1310 is in the on state, that the two-dimensional object 1313 is associated with at least a part of the three-dimensional object 1311 included in the first synthetic image 1301. In response to a request for reproduction, the electronic device 101 may reproduce movement such that the associated two-dimensional object 1313 moves in response to the movement of the three-dimensional object 1311. If the first button 1315 included in the displayed edit screen 1310 switches to an off state by a specified gesture, the electronic device 101 may configure the two-dimensional object 1313, which is associated with at least a part of the three-dimensional object 1311, so as not to be associated with at least a part of the three-dimensional object 1311.

Figure 14:
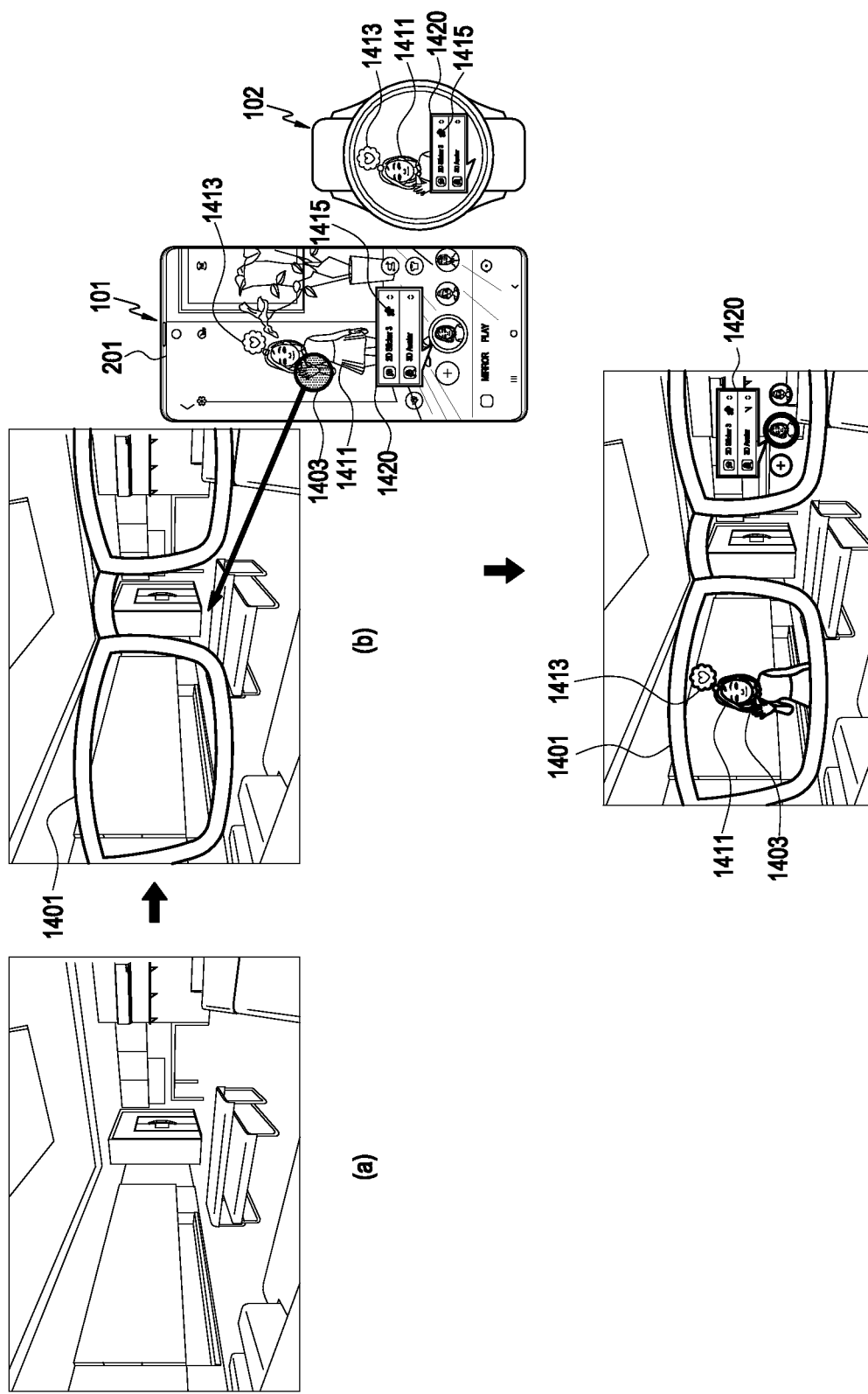
FIG. 14 is a diagram illustrating an operation of synthesizing a two-dimensional object with a three-dimensional object in an electronic device according to another embodiment.

FIG. 14 is a diagram illustrating an operation of synthesizing a two-dimensional object with a three-dimensional object in an electronic device according to another embodiment.

Referring to FIG. 14, an electronic device 1401 (e.g., the electronic device 102 in FIG. 1) according to another embodiment may be, for example, smart glasses (e.g., AR glasses (HMD)) capable of being worn on the user and implementing augmented reality (AR). As shown in (a) of FIG. 14, the electronic device 1401 may transparently show the position viewed by the user and display a synthetic image 1411 through augmented reality (AR). If the electronic device 1401 detects a specified user gesture through at least one sensor (e.g., at least one of a touch sensor, a motion sensor, a pressure sensor, a gyro sensor, or a camera sensor), as shown in (c) of FIG. 14, the electronic device 1401 may identify that the synthetic image 1403 has been selected and display an edit screen 1420 for editing the synthetic image 1403. If a first button 1415 is selected by a specified user gesture on the displayed edit screen 1420, the electronic device 1401 may associate a two-dimensional object 1413 with at least a part of a three-dimensional object 1411 and, in response to a request for reproduction, perform reproduction such that the associated two-dimensional object 1413 moves in response to the movement of the three-dimensional object 1411.

The electronic device 1401 (e.g., the electronic device 102 in FIG. 1) according to another embodiment may interwork with an electronic device 101 (e.g., the electronic device 101 in FIG. 1) and/or an external electronic device 1405 (e.g., a wearable device or accessory device). As an example, the electronic device 1401 may display the same synthetic image as the synthetic image 1411 displayed on the display 201 of the other electronic device 101. If the user selects the synthetic image 1411 in the electronic device 1401, the electronic device 1401 may receive information related to an edit screen 1420 to be displayed on the electronic device 101 and, based on the received information, display an edit screen 1420 together with the synthetic image 1411. If a first button 1415 displayed on the edit screen 1420 is selected by the user in the electronic device 101, the electronic device 1401 may generate a synthetic image (e.g., a first synthetic image) in which the two-dimensional object 1413 is associated with at least a part of the three-dimensional object 1411 and transmit information related to the generated synthetic image to the electronic device 1401. The electronic device 1401 may display the synthetic image (e.g., a first synthetic image) in which the two-dimensional object 1413 is associated with at least a part of the three-dimensional object 1411 and, in response to request for reproduction, perform reproduction such that the associated two-dimensional object 1413 moves in response to the movement of the three-dimensional object 1411. The synthetic image (e.g., a first synthetic image) reproduced by the electronic device 1401 may also be reproduced in the same manner in the electronic device 101.

An external electronic device 102 according to another embodiment may interwork with the electronic device 1401 and/or the electronic device 101, thereby displaying the same synthetic image as that displayed on an execution screen executed in the electronic device 1401 and/or the electronic device 101. If the displayed synthetic image is selected by the user, the external electronic device 1405 may display the edit screen 1420 and transmit information related to the edit screen 1420 to the electronic device 1401 and/or the electronic device 101. The electronic device 1401 and/or the electronic device 101 may display the same edit screen 1420, based on the information related to the edit screen 1420, which is received from the external electronic device 102. If a first button 1415 displayed on the edit screen 1420 is selected by the user, the external electronic device 102 may generate a synthetic image (e.g., a first synthetic image) in which the two-dimensional object 1413 is associated with at least a part of the three-dimensional object 1411 and transmit information related to the produced synthetic image to the electronic device 1401 and/or the electronic device 101. The electronic device 1401 may display a synthetic image (e.g., a first synthetic image), based on the information related to the synthetic image and, in response to a request for reproduction, perform reproduction such that the associated two-dimensional object 1413 moves in response to the movement of the three-dimensional object 1411. The synthetic image (e.g., a first synthetic image) reproduced by the electronic device 1401 may also be reproduced in the same manner by the electronic device 101 and/or the external electronic device 102.

An operation method of an electronic device (e.g., the electronic device 101 in FIG. 1) for synthesizing a two-dimensional object with a three-dimensional object according to an embodiment of the present disclosure may include controlling a display (e.g., the display module 160 in FIG. 1 or the display 201 in FIG. 2) of the electronic device to display a three-dimensional object, at least one two-dimensional object, and at least one first button corresponding to the at least one two-dimensional object, configuring, in response to an input for selecting the at least one first button, the at least one two-dimensional object to be associated with at least a part of the three-dimensional object such that the at least one two-dimensional object moves in response to movement of at least a part of the three-dimensional object, and producing a first synthetic image including the three-dimensional object and the at least one two-dimensional object associated with at least a part of the three-dimensional object.

The method according to an embodiment may further include reproducing the first synthetic image such that the at least one two-dimensional object moves in response to the movement of at least a part of the three-dimensional object.

The method according to an embodiment may further include, if the at least one first button is not selected, producing a second synthetic image including the three-dimensional object and the at least one two-dimensional object that is not associated with at least a part of the three-dimensional object, and reproducing the second synthetic image such that at least a part of the three-dimensional object moves without movement of the at least one two-dimensional object.

The method according to an embodiment may further include, if the at least one two-dimensional object is a dynamic object, configuring the at least one two-dimensional object to be associated with at least a part of the three-dimensional object such that a shape of the at least one two-dimensional object dynamically changes in response to the movement of at least a part of the three-dimensional object, and producing a third synthetic image including the three-dimensional object and the at least one two-dimensional object associated with at least a part of the three-dimensional object.

The method according to an embodiment may include controlling the display to display the three-dimensional object on a first area of a first screen and display the at least one two-dimensional object at a position overlapping or adjacent to a part of the three-dimensional object, controlling the display to display an object for selecting the three-dimensional object on a second area of the first screen, controlling the display to display an object for selecting the at least one two-dimensional object on the second area of the first screen, and controlling the display to display the at least one first button corresponding to the at least one two-dimensional object and at least one second button, and the at least one second button may be a button for specifying an additional movement corresponding to a gesture input.

The method according to an embodiment may include, in response to an input for selecting the at least one second button, detecting an input of a specified gesture for moving another two-dimensional object that is not associated with the three-dimensional object, identifying a movement path of the other two-dimensional object according to the input of the specified gesture, specifying movement of the other two-dimensional object, based on the identified movement path, in the first synthetic image, and reproducing the first synthetic image such that the at least one two-dimensional object moves in response to the movement of at least a part of the three-dimensional object and such that the other two-dimensional object moves based on the identified movement path.

The method according to an embodiment may further include controlling the display to display movement types for assigning movements to the three-dimensional object.

The method according to an embodiment may further include, if a position for associating the at least one two-dimensional object with the three-dimensional object changes, controlling the display to display a visual effect at the changed position and controlling the display to display text or an image indicating the changed position on the at least one first button.

The method according to an embodiment may further include, if the at least one two-dimensional object is selected by a specified gesture, controlling the display to display a guide box on the at least one two-dimensional object and display the at least one two-dimensional object on the uppermost layer.

According to various embodiments, a non-transitory storage medium for storing a computer program may be provided, and the program may include executable instructions that cause, when executed by a processor (e.g., the processor 120 in FIG. 1), the processor to control a display (e.g., the display module 160 in FIG. 1) of an electronic device (e.g., the electronic device 101 in FIG. 1) to display a three-dimensional object, at least one two-dimensional object, and at least one first button corresponding to the at least one two-dimensional object, configure, in response to an input for selecting the at least one first button, the at least one two-dimensional object to be associated with at least a part of the three-dimensional object such that the at least one two-dimensional object moves in response to movement of at least a part of the three-dimensional object, and generate a first synthetic image including the three-dimensional object and the at least one two-dimensional object associated with at least a part of the three-dimensional object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
memory storing instructions; and
at least one processor including processing circuitry;
wherein the instructions, when executed by the at least one processor individually or collectively, cause the electronic device to:
control the display to display a three-dimensional object on a screen, wherein the screen comprises a button corresponding to the three-dimensional object, and a plurality of first buttons and a plurality of second buttons corresponding to a plurality of two-dimensional objects and gesture inputs associated with the plurality of two-dimensional objects,
in response to a first input for selecting at least one first button among the plurality of first buttons, display a first two-dimensional object corresponding to the at least one first button on the screen and associate the first two-dimensional object with a part of the three-dimensional object,
generate a first synthetic image comprising the three-dimensional object and the first two-dimensional object associated with the part of the three-dimensional object, wherein the first two-dimensional object moves in a movement path associated with a movement of the part of the three-dimensional object based on identifying a playback request of the first synthetic image,
detect, in response to a second input for selecting at least one second button among the plurality of second buttons, a first specified gesture for moving a second two-dimensional object among the plurality of two-dimensional objects, the second two-dimensional obiect not being associated with the three-dimensional object, and
control the display to display the first synthetic image, wherein the first synthetic image comprises the first two-dimensional object moving in the movement path associated with the movement of the part of the three-dimensional object and the second two-dimensional object moving based on a movement path associated with the first specified gesture.

2. The electronic device of claim 1, wherein the instructions, when executed by the at least one processor individually or collectively, cause the electronic device to:
generate, based on the at least one first button not being selected, a second synthetic image comprising the three-dimensional object and the first two-dimensional object that is not associated with the part of the three-dimensional object, and
control the display to display the second synthetic image, wherein the second synthetic image comprises the part of the three-dimensional object moving without moving the first two-dimensional object.

3. The electronic device of claim 1,
wherein the part of the three-dimensional object is a first part,
wherein, based on the first two-dimensional object being a dynamic object, the association comprises dynamically changing a shape of the first two-dimensional object in response to the movement of at least a second part of the three-dimensional object, and
wherein the instructions, when executed by the at least one processor individually or collectively, cause the electronic device to generate a third synthetic image comprising the three-dimensional object and the first two-dimensional object associated with the second part of the three-dimensional object.

4. The electronic device of claim 1, wherein the instructions, when executed by the at least one processor individually or collectively, cause the electronic device to:
control the display to display the three-dimensional object on a first area of a first screen and display the first two-dimensional object at a position overlapping or adjacent to the part of the three-dimensional object,
control the display to display a first object for selecting the three-dimensional object on a second area of the first screen,
control the display to display a second object for selecting the first two-dimensional object on the second area of the first screen, and
control the display to display the plurality of first buttons and the plurality of second buttons, and wherein the plurality of second buttons are a button for specifying an additional movement corresponding to a first specific gesture associated with the second two-dimensional object.

5. The electronic device of claim 1, wherein the instructions, when executed by the at least one processor individually or collectively, cause the electronic device to control the display to display movement types for assigning movements to the three-dimensional object.

6. The electronic device of claim 1, wherein the instructions, when executed by the at least one processor individually or collectively, cause the electronic device to:
based on a position for associating the first two-dimensional object with the three-dimensional object changing, control the display to display a visual effect at a changed position and control the display to display text or an image indicating the changed position on the at least one first button, and
based on the first two-dimensional object being selected by the at least one first input, control the display to display a guide box on the first two-dimensional object and display the first two-dimensional object on an uppermost layer.

7. The electronic device of claim 1, further comprising a communication module configured to communicate with an external electronic device,
wherein the instructions, when executed by the at least one processor individually or collectively, cause the electronic device to:
control the communication module to transmit information related to the first synthetic image and information related to an edit screen comprising the first synthetic image and an edit button to the external electronic device such that the external electronic device displays the edit screen,
identify a second specified gesture for selecting or releasing the edit button included in the edit screen,
modify, based on the edit button displayed on the edit screen being released, the first synthetic image, wherein the modification comprises removing the association of the first two-dimensional object with the part of the three-dimensional object, and
control the communication module to transmit information related to the modified first synthetic image to the external electronic device.

8. A method for synthesizing a two-dimensional object with a three-dimensional object, the method being executed by a processor and the method comprising:
controlling a display of an electronic device to display a three-dimensional object on a screen, wherein the screen includes a button corresponding to the three-dimensional object, and a plurality of first buttons and a plurality of second buttons corresponding to a plurality of two-dimensional objects and gesture inputs associated with the plurality of two-dimensional objects;
in response to a first input for selecting at least one first button among the plurality of first buttons, displaying a first two-dimensional object corresponding to the at least one first button on the screen and associating the first two-dimensional object with a part of the three-dimensional object;
generating a first synthetic image comprising the three-dimensional object, the first two-dimensional object associated with the part of the three-dimensional object, wherein the first two-dimensional object moves in a movement path associated with a movement of the part of the three-dimensional object based on identifying playback request of the first synthetic image;

detecting, in response to a second input for selecting at least one second button among the plurality of second buttons, a first specified gesture for moving the second two-dimensional object among the plurality of two-dimensional objects, the second two-dimensional object not being associated with the three-dimensional object; and controlling the display to display the first synthetic image, wherein the first synthetic image comprises the first two-dimensional object moving in the movement path associated movement of the part of the three-dimensional object and the second two-dimensional object moving based on a movement path associated with the first specified gesture.

9. The method of claim 8, further comprising:

based on the at least one first button not being selected, generating a second synthetic image comprising the three-dimensional object and the first two-dimensional object that is not associated with the part of the three-dimensional object; and displaying the second synthetic image on the display, wherein the part of the three-dimensional object moves without moving the first two-dimensional object.

10. The method of claim 8, wherein the part of the three-dimensional object is a first part, and wherein based on the first two-dimensional object being a dynamic object, the association comprises dynamically changing a shape of the first two-dimensional object in response to the movement of a second part of the three-dimensional object; and wherein the method further comprises generating a third synthetic image comprising the three-dimensional object and the first two-dimensional object associated with the second part of the three-dimensional object.

11. The method of claim 8, further comprising:

controlling the display to display the three-dimensional object on a first area of a first screen and display the first two-dimensional object at a position overlapping or adjacent to the part of the three-dimensional object;

controlling the display to display a first object for selecting the three-dimensional object on a second area of the first screen;

controlling the display to display a second object for selecting the first two-dimensional object on the second area of the first screen; and controlling the display to display the plurality of first button and plurality of second buttons, wherein the plurality of second buttons are a button for specifying an additional movement corresponding to a first specific gesture associated with the second two-dimensional object.

12. The method of claim 8, further comprising:

based on a change in a position for associating the first two-dimensional object with the part of the three-dimensional object, controlling the display to display a visual effect at a changed position and controlling the display to display text or an image indicating the changed position on the at least one first button; and based on the first two-dimensional object being selected by the at least one first input, controlling the display to display a guide box on the first two-dimensional object and display the first two-dimensional object on an uppermost layer.

13. A non-transitory computer-readable storage medium for storing a program comprising executable instructions that, when executed by at least one processor of an electronic device, cause the electronic device to:

control a display of an electronic device to display a three-dimensional object, at least one two-dimensional object, and a plurality of first buttons and a plurality of second buttons corresponding to a plurality of two-dimensional objects and gesture inputs associated with the plurality of two-dimensional objects;

in response to a first input for selecting at least one first button among the plurality of first buttons displaying a first two-dimensional object corresponding to the at least one first button on the screen and associating the first two-dimensional object with a part of the three-dimensional object;

generate a first synthetic image comprising the three-dimensional object, the first two-dimensional object associated with the part of the three-dimensional object, the first synthetic image comprising the first two-dimensional object moving in a movement path associated with a movement of the part of the three-dimensional object based on identifying a playback request of the first synthetic image;

detecting, in response to a second input for selecting at least one second button among the plurality of second buttons, a first specified gesture for moving a second two-dimensional object among the plurality of two-dimensional objects, the second two-dimensional object not being associated with the three dimensional object; and control the display to display the first synthetic image, wherein the first synthetic image comprises the first two-dimensional object moving in the movement path associated with the movement of the part of the three-dimensional object and the second two-dimensional object moving based on a movement path associated with the first specified gesture.

* * * * *